United States Patent
Johnson et al.

(10) Patent No.: US 11,325,508 B2
(45) Date of Patent: May 10, 2022

(54) ADJUSTABLE HEADREST FOR JUVENILE VEHICLE SEAT

(71) Applicant: DOREL JUVENILE GROUP, INC., Foxboro, MA (US)

(72) Inventors: Jason H. Johnson, Brownstown, IN (US); Mei-Hui Lin, Nashville, IN (US); Devin J. Coakley, Bellingham, MA (US); Grant M. Mason, Wrentham, MA (US)

(73) Assignee: DOREL JUVENILE GROUP, INC., Foxboro, MA (US)

( * ) Notice: Subject to any disclaimer, the term of this patent is extended or adjusted under 35 U.S.C. 154(b) by 570 days.

(21) Appl. No.: 16/335,144

(22) PCT Filed: Sep. 26, 2018

(86) PCT No.: PCT/US2018/052915
§ 371 (c)(1),
(2) Date: Mar. 20, 2019

(87) PCT Pub. No.: WO2019/067588
PCT Pub. Date: Apr. 4, 2019

(65) Prior Publication Data
US 2021/0362631 A1    Nov. 25, 2021

Related U.S. Application Data

(60) Provisional application No. 62/563,348, filed on Sep. 26, 2017.

(51) Int. Cl.
*B60N 2/26* (2006.01)
*B60N 2/28* (2006.01)
*B60N 2/829* (2018.01)
*B60N 2/815* (2018.01)
*B60N 2/812* (2018.01)

(52) U.S. Cl.
CPC .......... *B60N 2/2851* (2013.01); *B60N 2/812* (2018.02); *B60N 2/815* (2018.02); *B60N 2/829* (2018.02)

(58) Field of Classification Search
CPC ....... B60N 2/2851; B60N 2/829; B60N 2/812
USPC ........................................ 297/250.1–256.16
See application file for complete search history.

(56) References Cited

U.S. PATENT DOCUMENTS

| 6,626,493 | B2 |  | 9/2003 | Kain | |
| 7,032,969 | B1 | * | 4/2006 | Campbell | B60N 2/2851 |
| | | | | | 297/256.1 |
| 9,415,707 | B2 |  | 8/2016 | Bohm | |
| 10,875,426 | B2 | * | 12/2020 | Johnson | B60N 2/829 |
| 2009/0309405 | A1 | * | 12/2009 | Maciejczyk | B60N 2/2812 |
| | | | | | 297/410 X |
| 2010/0264705 | A1 | * | 10/2010 | Karremans | B60N 2/2812 |
| | | | | | 297/250.1 |

(Continued)

OTHER PUBLICATIONS

PCT International Search Report and Written Opinion for PCT International Application No. PCT/US2018/052915, dated Dec. 7, 2018, 8 pages.

*Primary Examiner* — Rodney B White
(74) *Attorney, Agent, or Firm* — Barnes & Thornburg LLP

(57) ABSTRACT

A child restraint includes a seat bottom and a seat back. The seat back includes a backrest and an adjustable headrest that is mounted for up-and-down movement on the backrest by a caregiver.

22 Claims, 18 Drawing Sheets

(56) References Cited

U.S. PATENT DOCUMENTS

| | | | |
|---|---|---|---|
| 2012/0098309 A1* | 4/2012 | Gaudreau, Jr. | B60N 2/2812 297/256.11 |
| 2012/0153690 A1* | 6/2012 | Gaudreau, Jr. | B60N 2/2851 297/250.1 |
| 2012/0175921 A1* | 7/2012 | Gaudreau, Jr. | B60N 2/2884 297/256.11 X |
| 2012/0261960 A1 | 10/2012 | Heisey et al. | |
| 2012/0313413 A1* | 12/2012 | Hutchinson | B60N 2/2812 297/250.1 |
| 2013/0320725 A1 | 5/2013 | Conway | |
| 2013/0175835 A1* | 7/2013 | Fujita | B60N 2/2851 297/250.1 X |
| 2014/0021758 A1* | 1/2014 | Chen | B60N 2/26 297/256.11 |
| 2015/0035329 A1* | 2/2015 | Sparling | B60N 2/43 297/216.11 |
| 2016/0114705 A1* | 4/2016 | Morgenstern | B60N 2/2866 297/250.1 X |
| 2016/0114706 A1* | 4/2016 | Hutchinson | B60N 2/2863 297/256.13 |
| 2016/0144749 A1* | 5/2016 | Mo | B60N 2/42 297/256.11 |
| 2017/0008429 A1* | 1/2017 | Johnson | B60N 2/2872 |
| 2017/0106772 A1* | 4/2017 | Williams | B60N 2/2872 |
| 2017/0113576 A1* | 4/2017 | Jane Santamaria | B60N 2/2806 |
| 2017/0190268 A1* | 7/2017 | Zhao | B60N 2/2851 |
| 2018/0222358 A1* | 8/2018 | Oswald | B60N 2/2827 |
| 2018/0370392 A1* | 12/2018 | Harmes, V | B60N 2/2806 |
| 2019/0344694 A1* | 11/2019 | Johnson | B60N 2/2872 |

\* cited by examiner

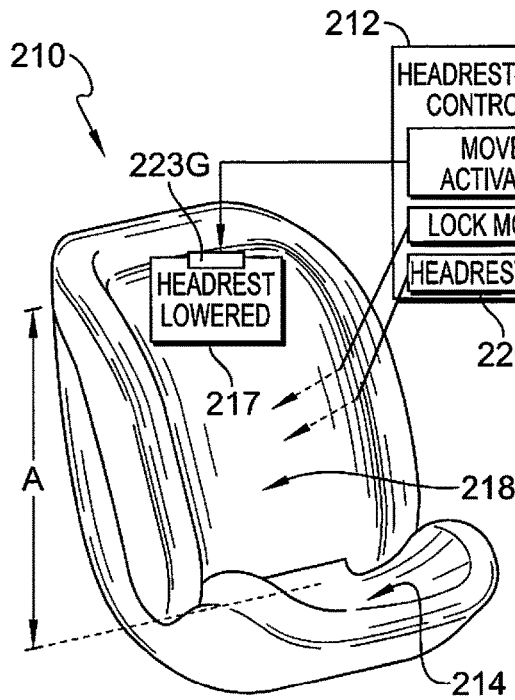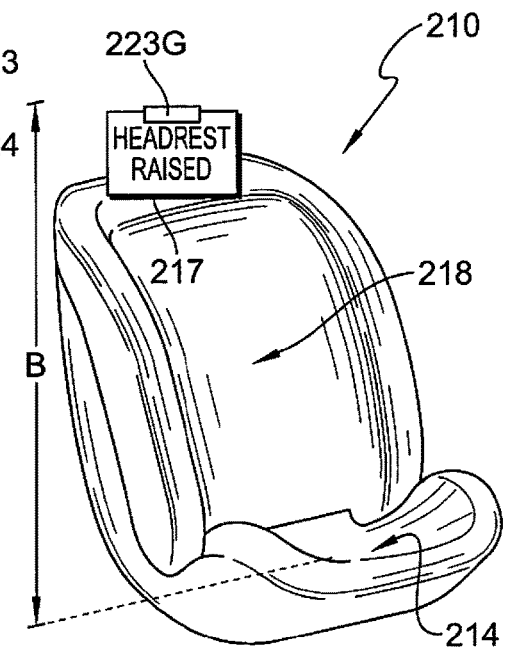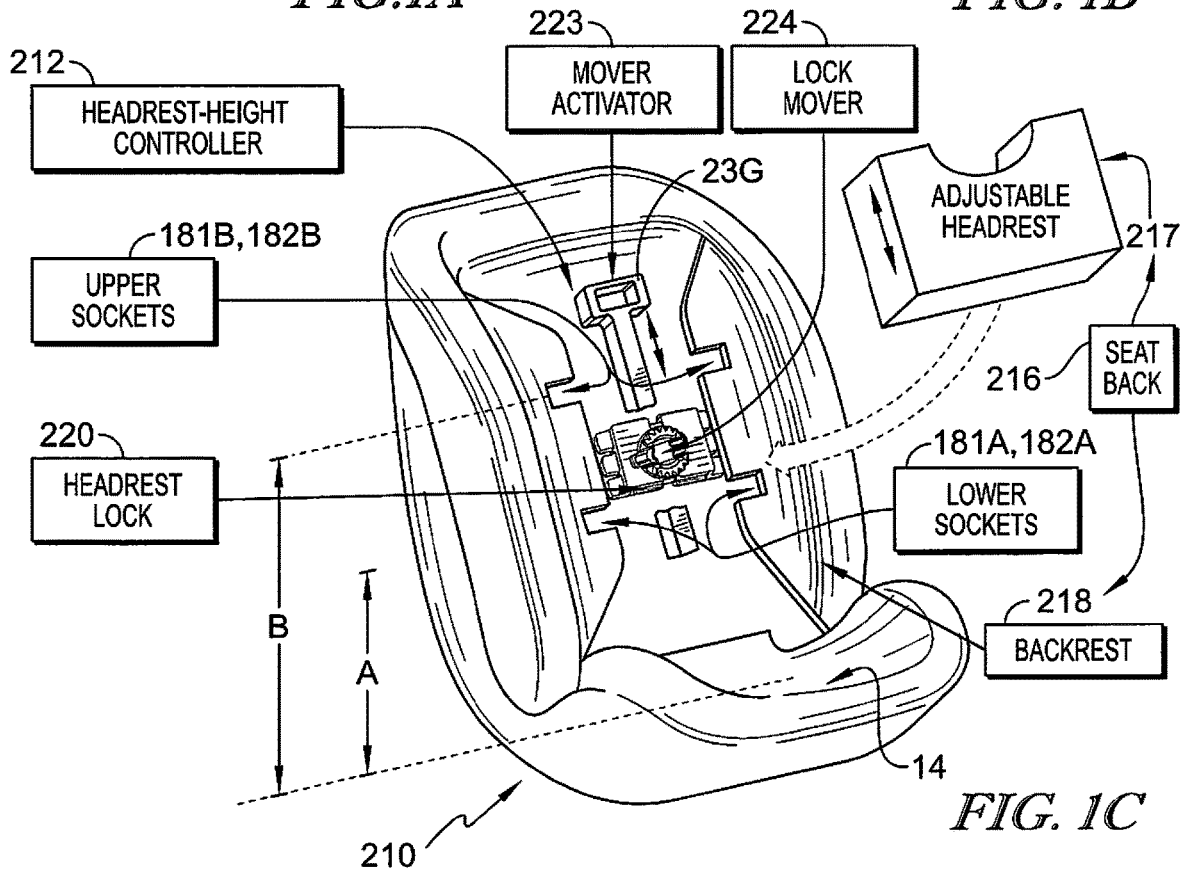
FIG. 1A
FIG. 1B
FIG. 1C

ADJUSTABLE HEADREST FOR JUVENILE VEHICLE SEAT

PRIORITY CLAIM

This application is a national stage entry made under 35 U.S.C. § 371 of PCT International Application No. PCT/US2018/052915, filed Sep. 26, 2018, which claims the benefit of and priority under 35 U.S.C. § 119(e) to U.S. Provisional Application No. 62/563,348, filed Sep. 26, 2017, the entire disclosures of which are expressly incorporated by reference herein.

BACKGROUND

The present disclosure relates to child restraints and in particular to a juvenile seat provided for use on passenger seat in a vehicle. More particularly, the present disclosure relates to a headrest in a juvenile seat.

SUMMARY

According to the present disclosure, a child restraint includes a headrest. In illustrative embodiments, the child restraint includes a seat bottom and a seat back extending upwardly from the seat bottom and including a backrest and the headrest. The headrest is adjustable so that it can be moved up and down on the backrest to accommodate seated children of different sizes.

In illustrative embodiments, the child restraint includes a headrest-height controller that is mounted on the headrest for up-and-down movement therewith relative to the backrest. The headrest-height controller includes a headrest lock for engaging and disengaging the backrest to control movement of the headrest relative to the backrest, a headrest-lock mover for moving the headrest lock to engage or disengage the backrest, and a mover activator that can be operated by a caregiver to activate the headrest-lock mover when it is desired to disengage the headrest lock from the backrest to free the headrest for up-and-down movement on the backrest.

In illustrative embodiments, the backrest is formed to include several sets of opposing blocker-receiver sockets. Each set is located at a different height above the seat bottom to correspond to one of several predetermined headrest elevation positions that are provided in the backrest and available to be selected by a caregiver using a headrest-height controller included in the child restraint to establish the position of the headrest on the backrest.

In illustrative embodiments, the headrest lock includes two headrest-motion blockers mounted for movement relative to one another on the backrest. Each headrest-motion blocker is sized to extend into one of the two available and opposing blocker-receiver sockets formed in the backrest when the headrest is moved to each one of the several predetermined headrest elevation positions to block further up-and-down movement of the headrest relative to the backrest so that a HEADREST-LOCKING mode of the headrest-height controller is established. The pair of opposing blocker-receiver sockets that are included in each set are arranged to lie in laterally spaced-apart opposing relation to one another. The headrest is locked so that it cannot move up and down relative to the backrest when the headrest-motion blockers extend away from one another into companion blocker-receiver sockets formed in the backrest.

In illustrative embodiments, the mover activator includes an activation handle that extends upwardly along the backrest and provides an exposed handgrip on the front side of the headrest that can be gripped by a caregiver and moved upwardly relative to the backrest to actuate a rack-and-pinion system that is made in accordance with the present disclosure and included in the headrest-lock mover so as to move first and second headrest-motion blockers of headrest lock either into or out of a selected set of opposing blocker-receiver sockets formed in the backrest. A HEADREST-LOCKING mode of the headrest-height controller is established when the headrest-motion blockers are moved laterally away from one another in opposite outward directions to extend into one of the sets of opposing blocker-receiver sockets formed in the backrest. A HEADREST-UNLOCKING mode of the headrest-height controller is established when the headrest-motion blockers are moved laterally toward one another in inward directions to exit from the opposing blocker-receiver sockets in one of the sets of sockets formed in the backrest.

In illustrative embodiments, the rack-and-pinion system provided in the headrest-lock mover of the headrest-height controller in accordance with the present disclosure includes a rotary driver comprising first and second motion-transfer gears. The rotary driver cooperates with gear-engaging racks included in the headrest-lock mover and coupled to each of the activation handle and the headrest-motion blockers to establish the rack-and-pinion system in accordance with the present disclosure.

In an illustrative embodiment, the first and second motion-transfer gears included in the rotary driver of the headrest-lock mover are connected to one another by a gear mount that is located between the two gears so that the two gears always rotate together about a single (common) axis of rotation in the same direction. The first motion-transfer gear comprises two separate gear teeth that extend in opposite directions. A first gear tooth engages one main first-gear rack that is coupled to the first headrest-motion blocker and a second gear tooth engages another auxiliary first-gear single rack that is coupled to the second headrest-motion blocker. The second motion-transfer gear is a two-part pinion gear that extends away from the backrest and the first motion-transfer gear and engages one main second-gear rack that is coupled to one side of a lower portion of the activation handle and another auxiliary second-gear rack that is coupled to an opposite side of the lower portion of the activation handle and arranged to face toward the one second-gear rack.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1A is a diagrammatic perspective view of a child restraint comprising a seat bottom, a seat back including a backrest and an adjustable headrest that is mounted for up-and-down movement on the backrest, and a headrest-height controller that moves up and down with the adjustable headrest and suggesting that the headrest-height controller includes a headrest lock, a lock mover, and a lock-mover activator that extends upwardly behind the headrest and showing that a handgrip included in the lock-mover activator is exposed above a front side of the adjustable headrest and that the adjustable headrest is retained in a LOWERED position on the backrest by the headrest-height controller when the headrest-height controller is in a HEADREST-LOCKING mode;

FIG. 1B is a diagrammatic view similar to FIG. 1A showing the adjustable headrest in a RAISED position on the backrest after a caregiver has moved the activation handle upwardly to unlock a locking mechanism included in the headrest-height controller to change the headrest-height controller to a HEADREST-UNLOCKING mode so as to free the headrest to be moved upwardly to the RAISED position until the locking mechanism re-engages the backrest to re-establish a HEADREST-LOCKING mode of the headrest-height controller;

FIG. 1C is a diagrammatic perspective view of the child restraint of FIGS. 1A and 1B showing a headrest-height controller in accordance with a first embodiment of the present disclosure and suggesting that upward movement of an activation handle included in the lock-mover activator functions first to rotate first and second motion-transfer gears included in a lock mover about a common axis rotation in a first direction to withdraw first and second headrest-motion blockers included in the headrest lock from opposing lower sockets formed in the backrest to convert the headrest-height controller to the HEADREST-UNLOCKING mode and suggesting that the adjustable headrest is now free to be moved along with the activation handle upwardly away from the seat bottom by a caregiver from the LOWERED position shown in FIG. 1A to the RAISED position shown in FIG. 1B at which point the first and second headrest-motion blockers can be moved away from one another to extend into the opposing upper sockets formed in the backrest to re-establish the HEADREST-LOCKING mode of the headrest-height controller and to retain the headrest in the RAISED position;

DETAILED DESCRIPTION

Figure 2A:
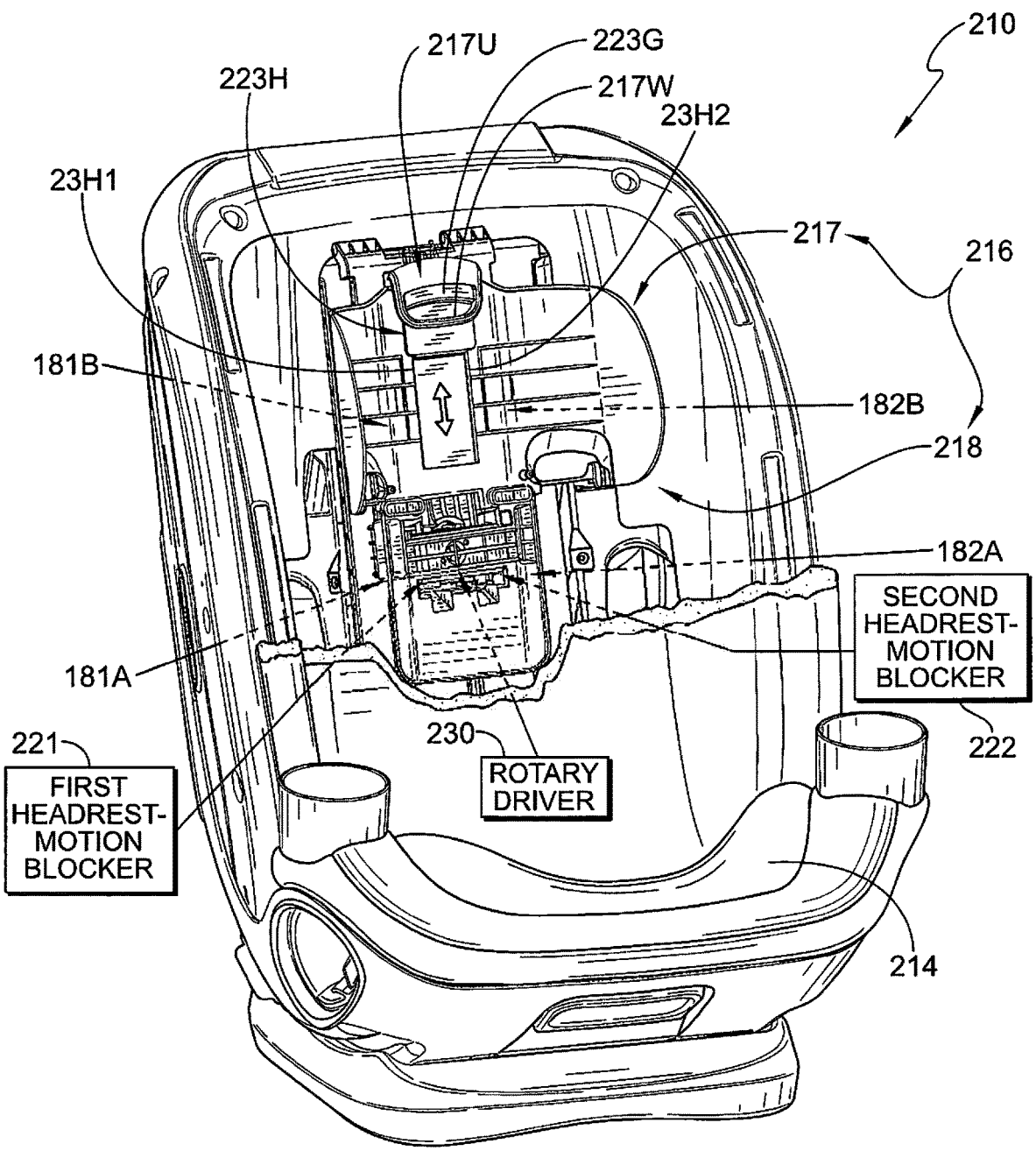
FIG. 2A is a perspective view of an illustrative child restraint including a headrest-height controller in accordance with a second embodiment of the present disclosure and showing that: (1) the activation handle of the mover activator of the headrest-height controller is mounted for up-and-down sliding movement relative to the backrest and to the adjustable headrest, (2) an upper portion of the adjustable headrest is formed to include a forward-facing handgrip window that will be visible to a caregiver facing toward a front side of the adjustable headrest, and (3) an upper end of the activation handle includes a handgrip that has a downwardly facing bottom edge that is adapted to be engaged by fingertips of the caregiver and that is exposed in the forward-facing handgrip window to be seen and touched by the caregiver when the activation handle is urged downwardly to a lowered position by a return spring shown diagrammatically in FIG. 4.

A child restraint 210 including a headrest-height controller 212 in accordance with the present disclosure is shown in FIGS. 1-15. Child restraint 210 also includes a seat bottom 214 and a seat back 216 extending upwardly from seat bottom 214 as shown in FIGS. 1A-1C. Seat back 216 includes an adjustable headrest 217 and a headrest-supporting backrest 218. Adjustable headrest 217 is mounted for up-and-down movement on backrest 218 at the option of a caregiver using headrest-height controller 212.

Figure 2B:
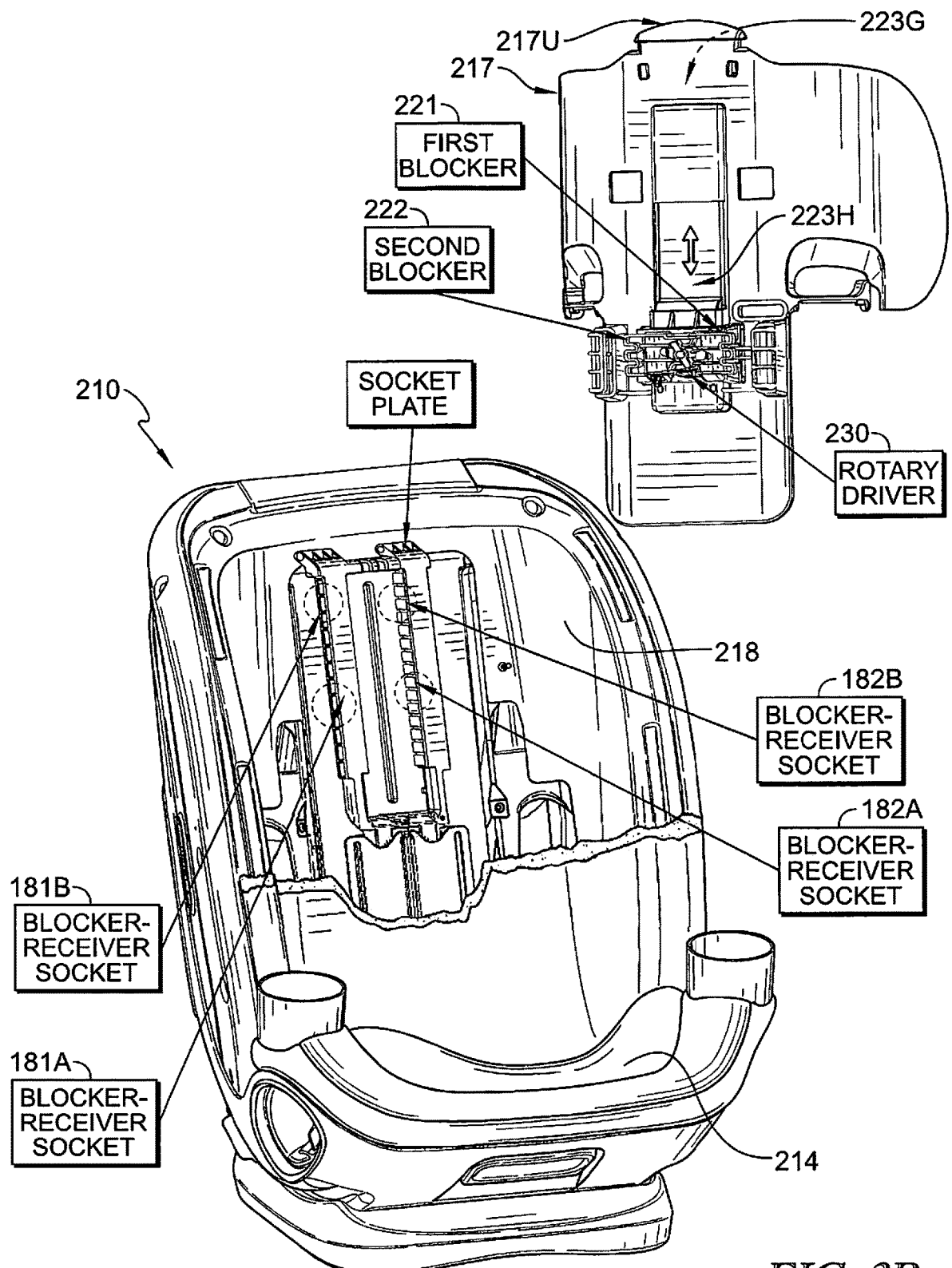
FIG. 2B is a perspective view similar to FIG. 2A after removal of the adjustable headrest and the headrest-height controller from the backrest and suggesting that several sets of opposing blocker-receiver sockets are formed in the backrest and that each set is located at a predetermined elevation above the seat bottom and suggesting that the headrest-height controller includes a rotary driver that is interposed between and connected to horizontally slidable first and second headrest-motion blockers and is connected to a lower portion of a vertically slidable activation handle as suggested in FIGS. 5, 6A, and 8.
Figure 3:
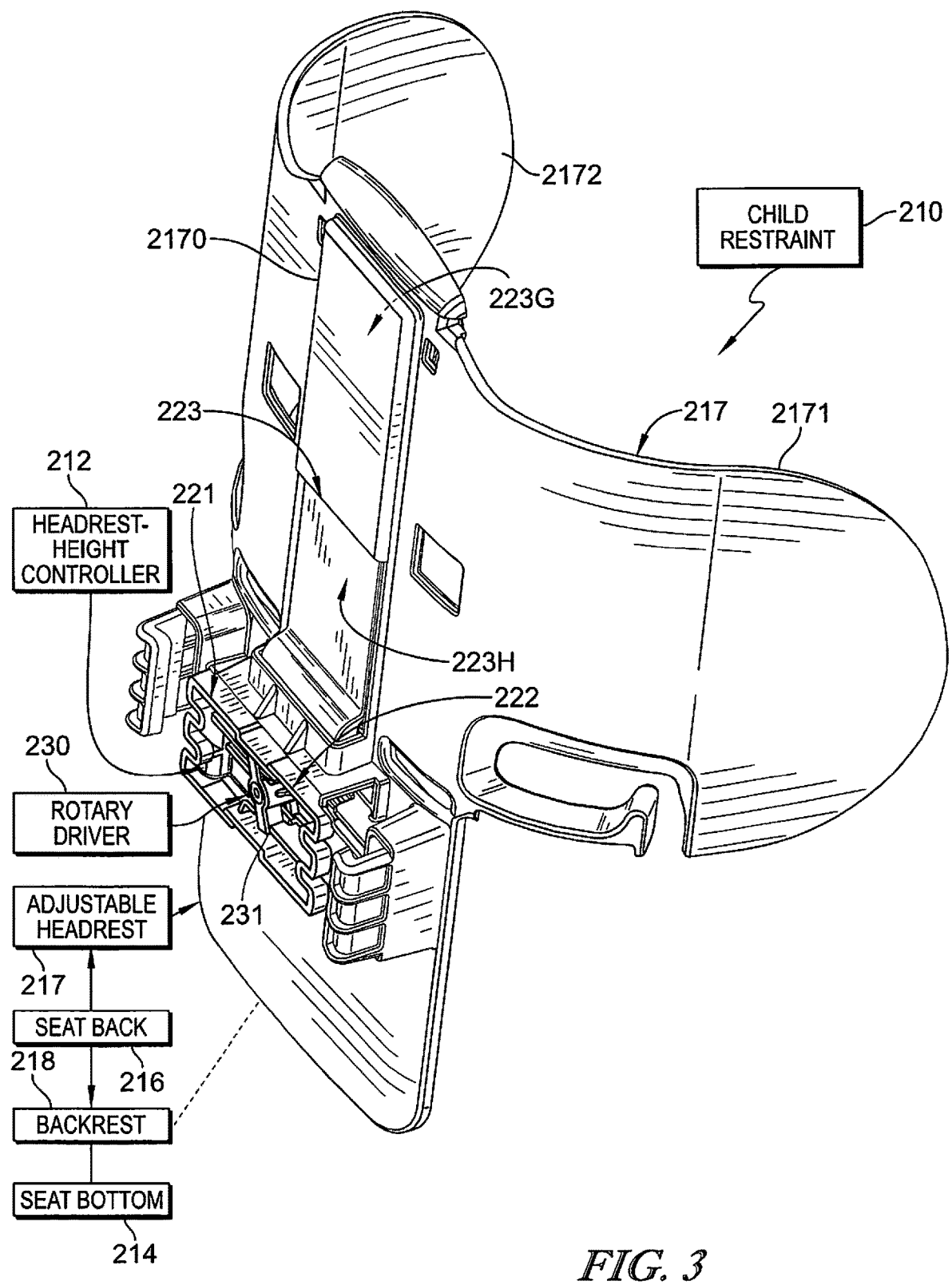
FIG. 3 is a diagrammatic view of the child restraint of FIGS. 2A and 2B and includes an illustrative rear perspective view of an adjustable headrest and of a headrest-height controller that is mounted on a center panel of the adjustable headrest for up-and-down movement therewith relative to the backrest.

Backrest 218 is formed to include at least several vertically spaced-apart sets of opposing first and second blocker-receiver sockets as suggested in FIGS. 1C and 2B. Each set is located at a different elevation above seat bottom 214 to establish one of the predetermined headrest elevation positions of headrest 217 that can be selected by a caregiver using headrest-height controller 212 as suggested in FIG. 1C.

Figure 7:
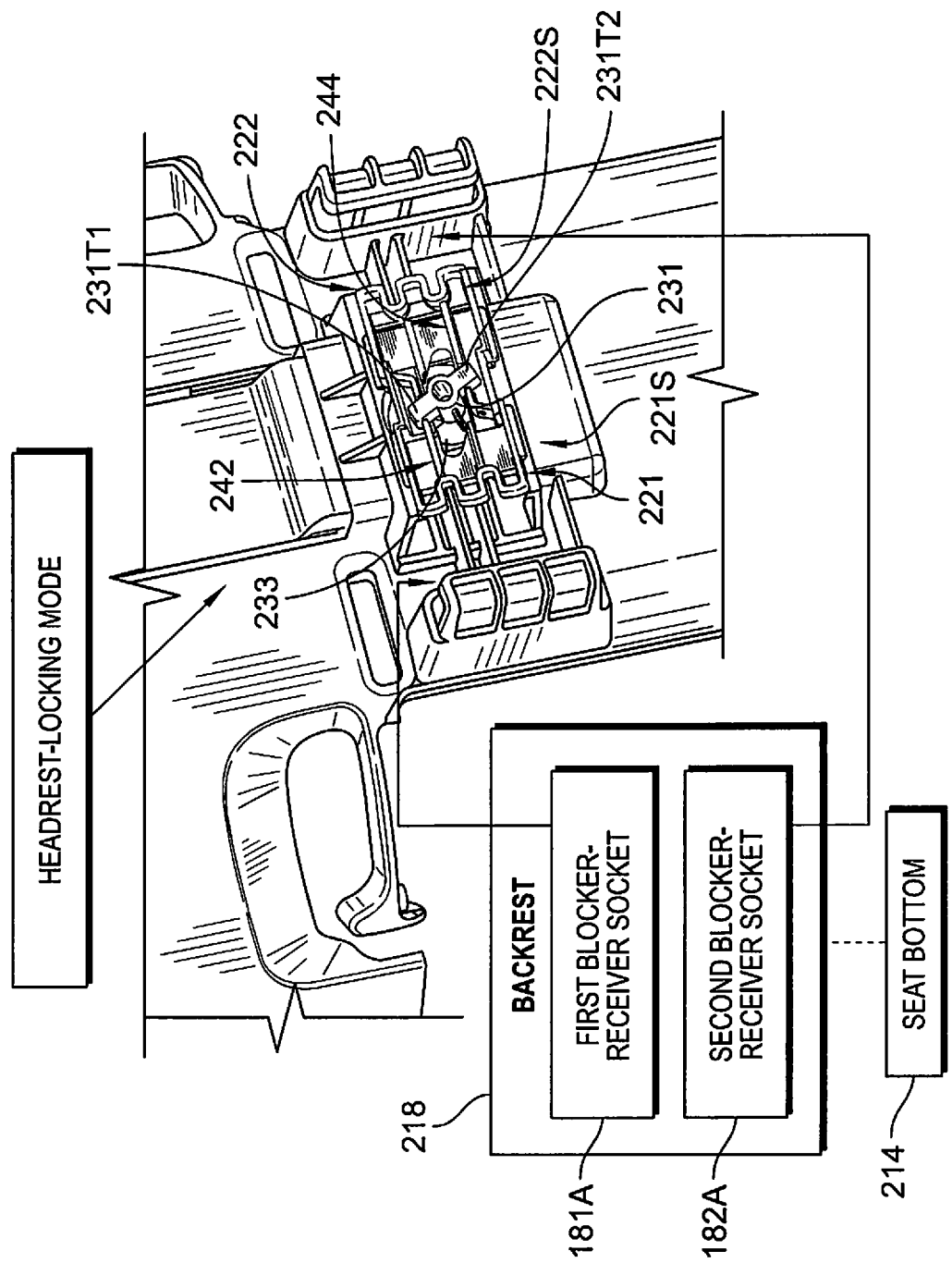
FIG. 7 is an enlarged rear elevation view of a portion of the assembly shown in FIG. 6 showing that the first and second motion-transfer gears of the rotary driver included in the headrest-lock mover of the headrest-height controller has been rotated about a common axis of rotation by the activation handle of the mover activator to move the first and second headrest-motion blockers laterally away from one another to extend into companion opposing blocker-receiver sockets (illustrated diagrammatically) formed in the adjacent headrest-supporting backrest when the headrest-height controller is placed in HEADREST-LOCKING MODE.

Backrest 218 is formed to include at least one set of opposing first and second blocker-receiver sockets 181A, 182A that are located at a first elevation above seat bottom 14 as suggested diagrammatically in FIG. 7. It is within the scope of this disclosure to form backrest 218 to include a second set of opposing first and second blocker-receiver sockets 181B, 182B located at a relatively higher second elevation above seat bottom 214 as suggested diagrammatically in FIG. 1C. Other sets of opposing blocker-receiver sockets are within the scope of the present disclosure to establish other elevations for headrest 217 above seat bottom 214 as suggested in FIG. 2B.

Headrest-height controller 212 includes a headrest lock 220, a headrest-lock mover 224, and a mover activator 223 as suggested in FIG. 7. Headrest-lock mover 224 comprises a two-gear rack-and-pinion system that links mover activator 223 to headrest lock 220 as suggested in FIG. 5.

Headrest lock 220 comprises laterally movable first and second headrest-motion blockers 221, 222 as suggested in FIGS. 3-5 and 7. Headrest-height controller 212 is used by a caregiver either to move first and second headrest-motion blockers 221, 222 away from one another to engage backrest 218 to block movement of headrest 17 relative to backrest 218 or to move first and second headrest-motion blockers 221, 222 toward one another to free headrest 217 to be moved up or down by caregiver relative to backrest 218.

A caregiver can operate headrest-height controller 212 to move first headrest-motion blocker 221 outwardly in a first direction to extend into the first blocker-receiver socket 181A formed in backrest 218 and move second headrest-motion blocker 222 outwardly in an opposite second direction to extend into the opposing second blocker-receiver socket 182A formed in backrest 218 so that up-and-down motion of headrest 217 relative to backrest 18 is blocked as suggested in FIG. 7. This outward movement of headrest-motion blockers 221, 222 establishes a HEADREST-LOCKING mode of headrest-height controller 212 as suggested in FIGS. 6, 6A, 6B and 7.

Figure 10:
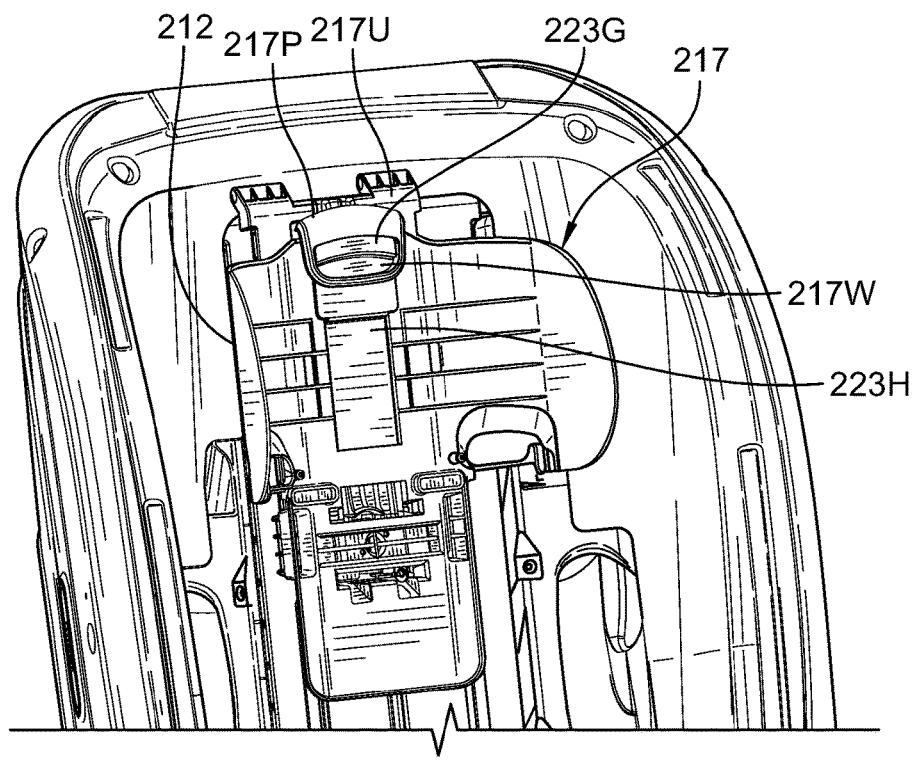
FIG. 10 is a view similar to FIG. 6 showing the headrest-height controller in a HEADREST-UNLOCKING mode to free the headrest for up-and-down movement relative to the adjacent headrest-supporting backrest after the caregiver has gripped a top handle included in the activation handle and raised the activation handle in an upward direction.
Figure 10A:
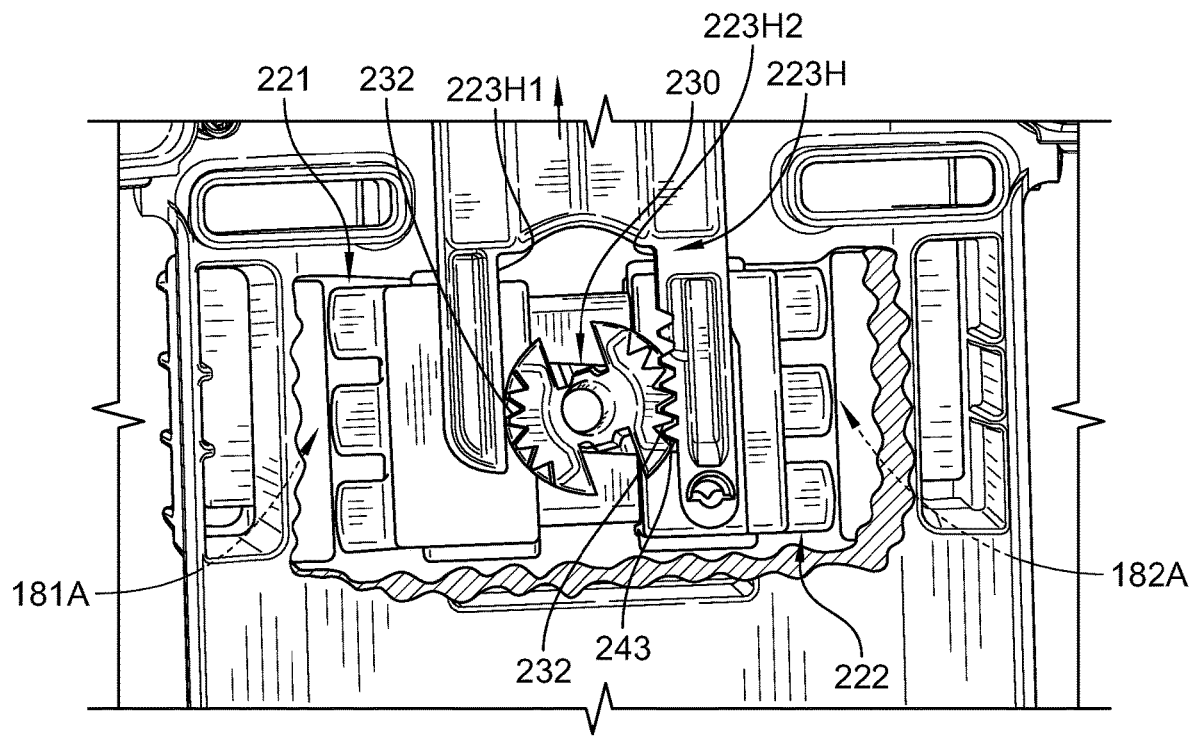
FIG. 10A is an enlarged rear view of a portion of the child restraint shown in FIG. 10 showing engagement of the rotary gear with the second main and auxiliary gear racks included in the activation handle and suggesting that the first headrest-motion blocker (on the left) is retracted inwardly by the rotary driver out of a companion blocker-receiver socket formed in the backrest and that the second headrest-motion blocker (on the right) is retracted inwardly by the rotary driver out of a companion blocker-receiver socket formed in the backrest when the headrest-height controller is placed in the HEADREST-UNLOCKING MODE.
Figure 11:
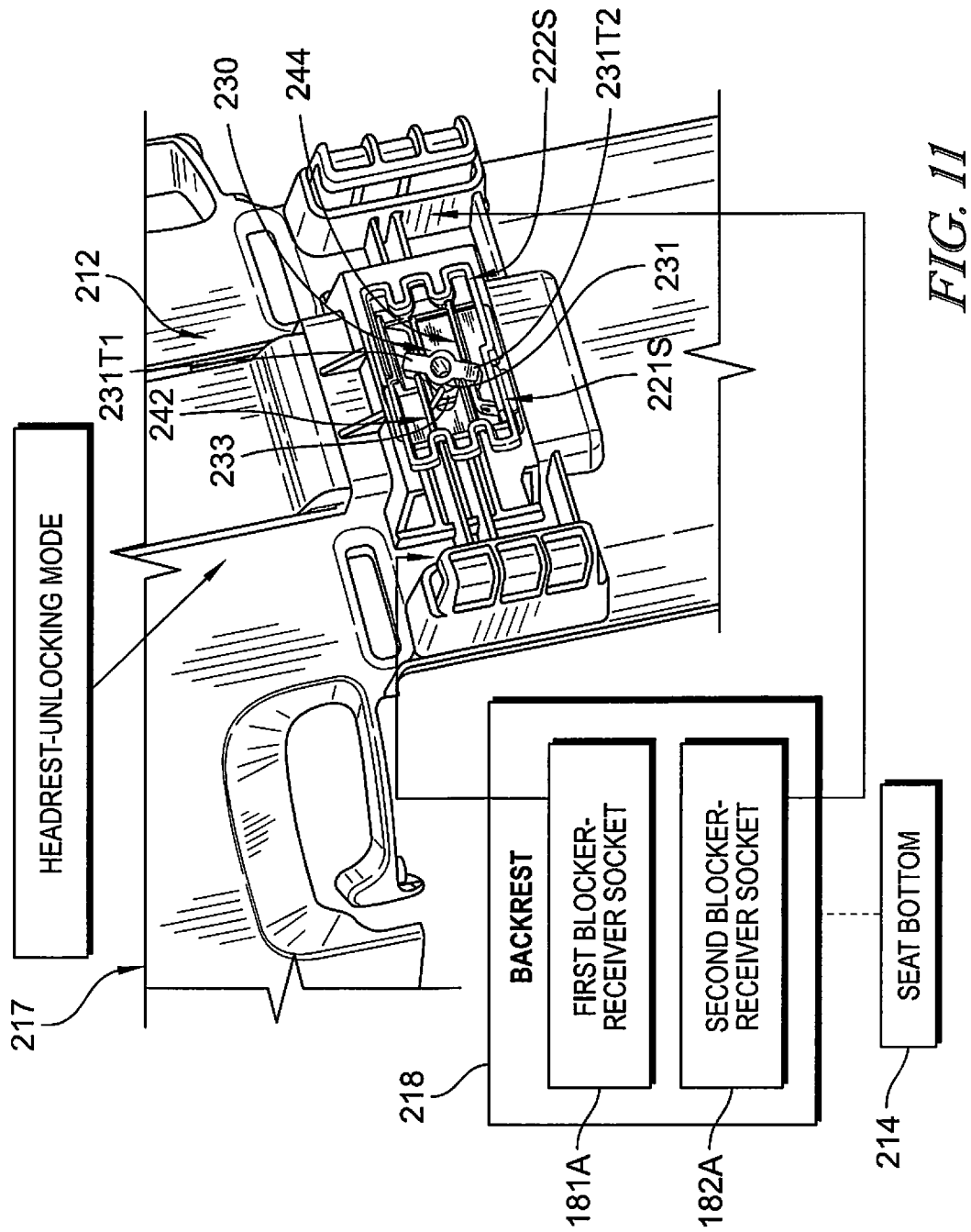
FIG. 11 is an enlarged rear elevation view of a portion of the assembly shown in FIG. 10 showing that the rotary driver included in the headrest-lock mover of the headrest-height controller has been rotated about its axis of rotation by the raised activation handle of the mover activator to move the first and second headrest-motion blockers laterally toward one another to exit the companion opposing motion-blocker sockets (illustrated diagrammatically) formed in the adjacent headrest-supporting backrest when the headrest-height controller is placed in HEADREST-UNLOCKING MODE.
Figure 12:
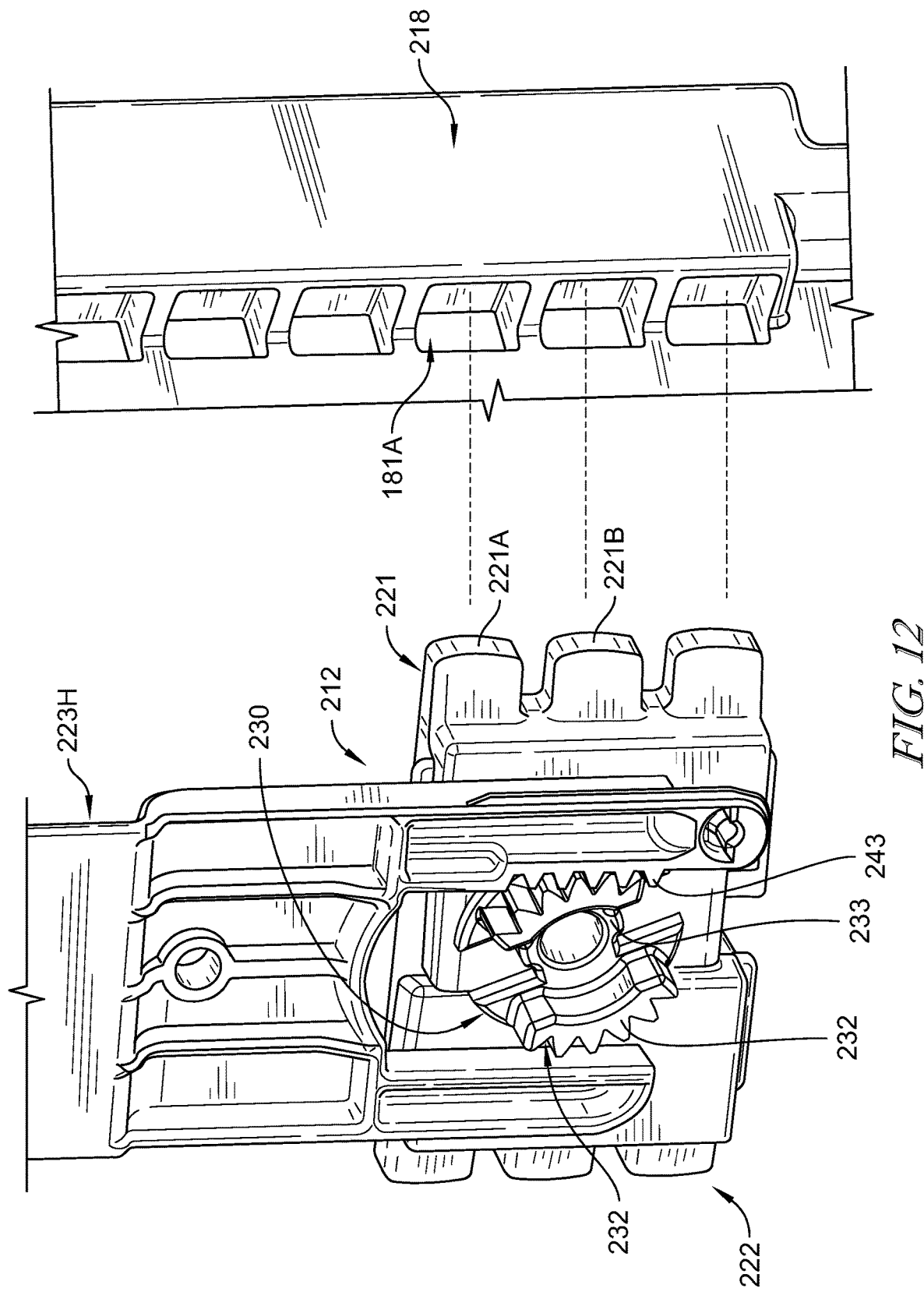
FIG. 12 is an enlarged front perspective view similar to FIG. 8 showing the first and second headrest-motion blockers in their motion-allowing retracted positions and suggesting that each of the two outwardly projecting cantilevered tabs included in the first headrest-motion blocker is sized, shaped, and arranged to be extended into a companion blocker-receiver socket formed in the backrest during rotation of the rotary driver about its axis of rotation in response to vertical movement of the activation handle relative to the backrest.

Alternatively, the caregiver can operate headrest-height controller 212 to establish a HEADREST-UNLOCKING mode as suggested in FIGS. 10, 10A, and 11 by causing the first and second headrest-motion blockers 221, 222 to move inwardly toward one another to exit the opposing first and second blocker receiver sockets 181A, 182A formed in backrest 218. This inward movement of headrest-motion blockers 221, 222 unlocks headrest 217 from backrest 218 to and free headrest 217 to move up or down on backrest 218 as desired by a caregiver to a new headrest elevation position relative to seat bottom 214.

Mover activator 223 is used by a caregiver to activate a two-gear rack-and-pinion system provided by lock mover 224 to cause the first and second headrest-motion blockers 221, 222 of headrest lock 212 to move into or out of the opposing first and second blocker-receiver sockets 181A, 182A when the caregiver desires to change headrest-height controller 212 the HEADREST-LOCKING mode to the HEADREST-UNLOCKING mode. Headrest-lock mover 224 provides a two-gear rack-and-pinion system in accordance with the present disclosure as suggested in FIGS. 5 and 5A.

Figure 5:
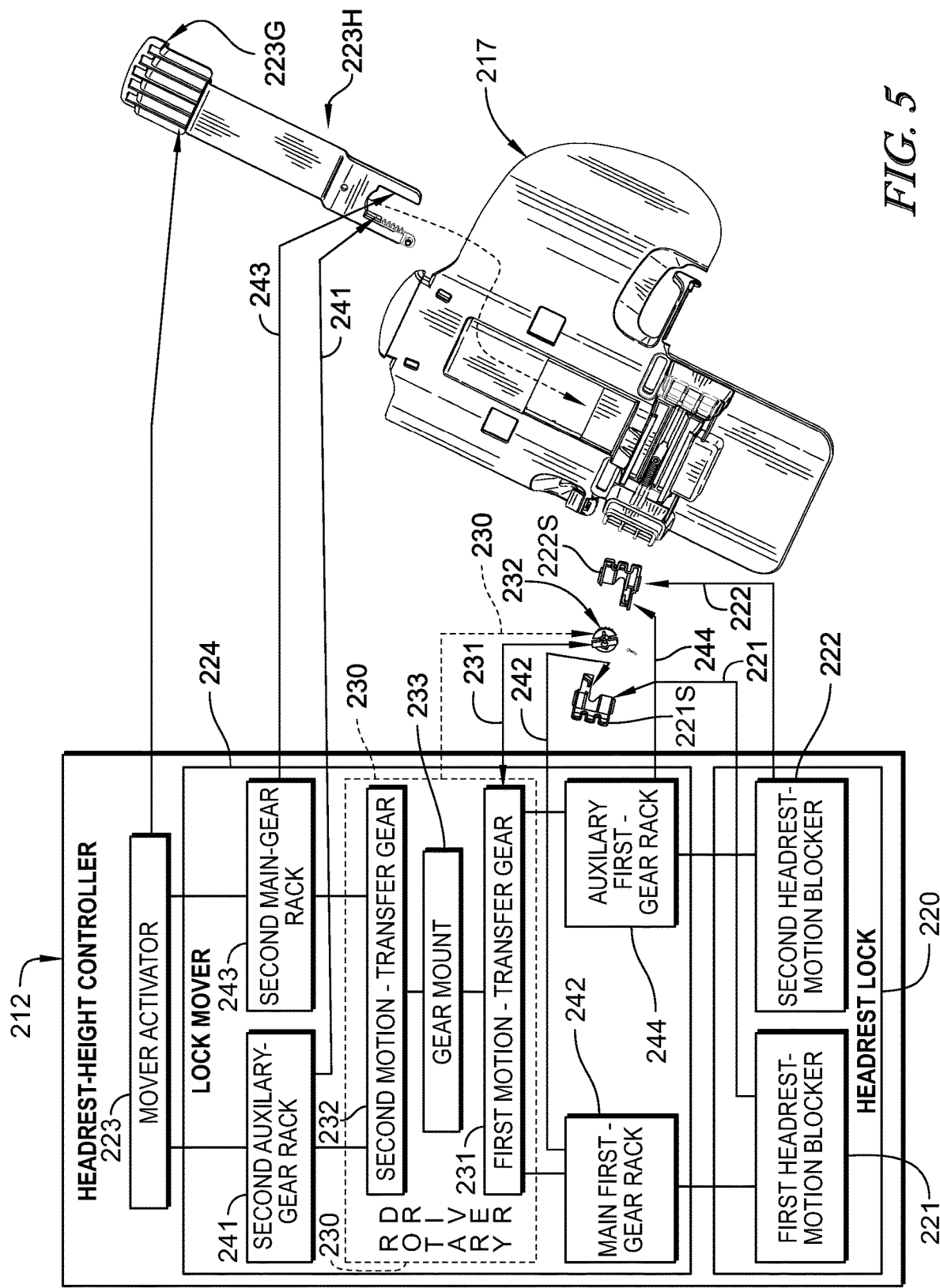
FIG. 5 is an illustrative rear perspective view of the adjustable headrest of FIG. 3 showing that the headrest-height controller includes a headrest lock, a headrest-lock mover, and a mover activator and suggesting that (1) the headrest lock includes slidable first and second headrest-motion blockers, (2) the headrest-lock mover provides a rack-and-pinion system that includes a first-gear rack on each of the first and second headrest-motion blockers, two second-gear racks on the activation handle included in the mover activator, and a rotary driver having a first motion-transfer gear engaging the two first-gear racks associated with the headrest-motion blockers and a second motion-transfer gear engaging the two second-gear racks associated with the activation handle, and (3) the activation handle of the mover activator can be gripped at an upper end thereof by a caregiver and moved upwardly relative to the backrest and the headrest to activate the rack-and-pinion system in the headrest-lock mover.
Figure 5A:
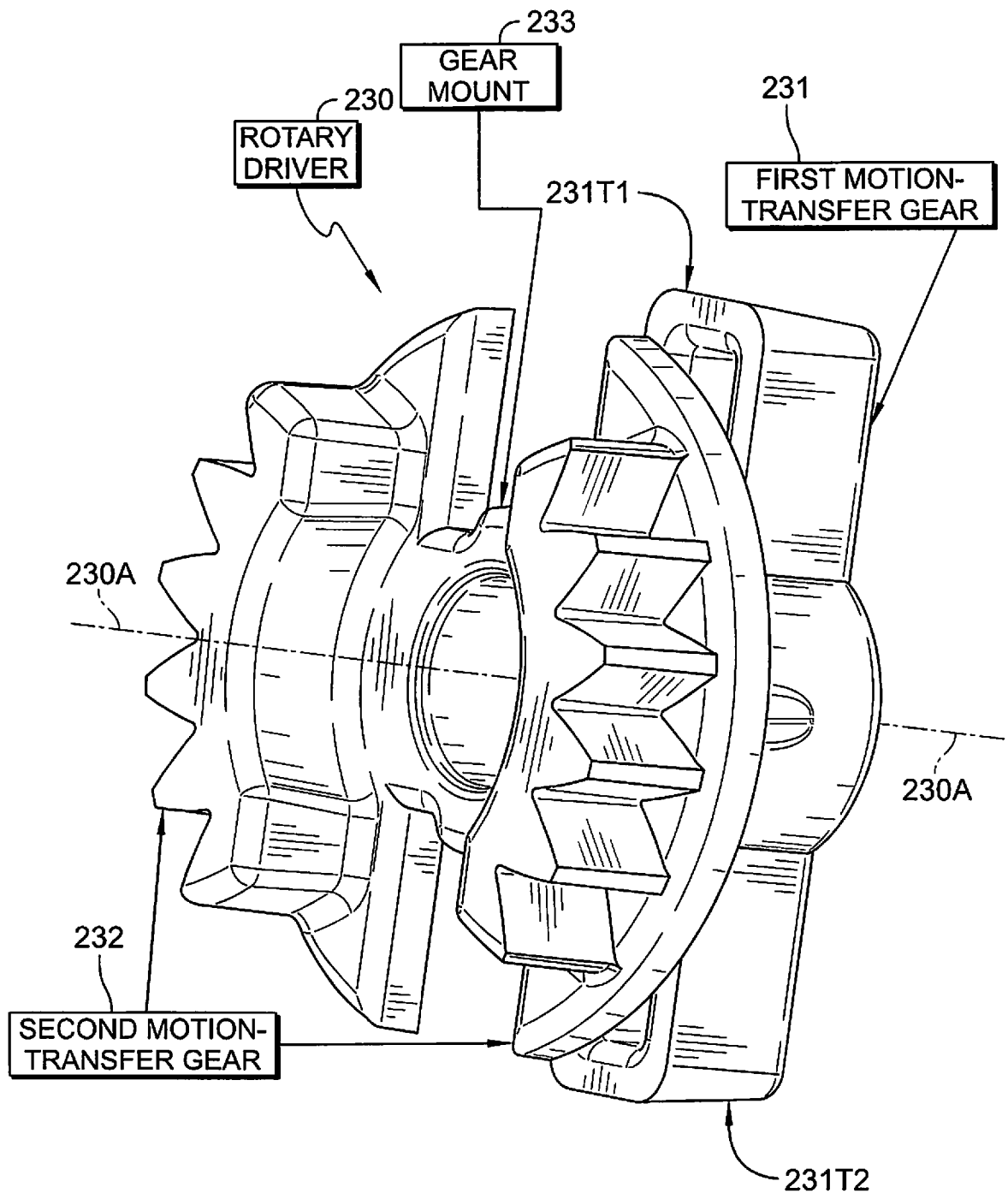
FIG. 5A is an enlarged perspective view of the rotary driver of FIG. 5 showing that the rotary driver includes a first motion-transfer gear on the left, a second motion-transfer gear on the right, and a cylinder-shaped gear mount arranged to lie between and interconnect the two motion-transfer gears so that they will rotate in the same direction about a common axis of rotation.

Headrest-lock mover 224 includes a rotary driver 230 comprising a first motion-transfer gear 231 and a second motion-transfer gear 232 as suggested in FIGS. 5 and 5A. Headrest-lock mover 224 also includes a rack system 240 that meshes with rotary driver 230 to form a two-gear rack-and-pinion system in accordance with the present disclosure. Rack system 240 includes one main first-gear rack 242 associated with first headrest-motion blocker 221, another auxiliary first-gear rack 244 associated with second headrest-motion blocker 222, and a second-gear rack 243 associated with mover activator 223 as suggested in FIG. 5. Rack system 240 may further include an auxiliary second gear rack 241 associated with mover activator 223.

Figure 4:
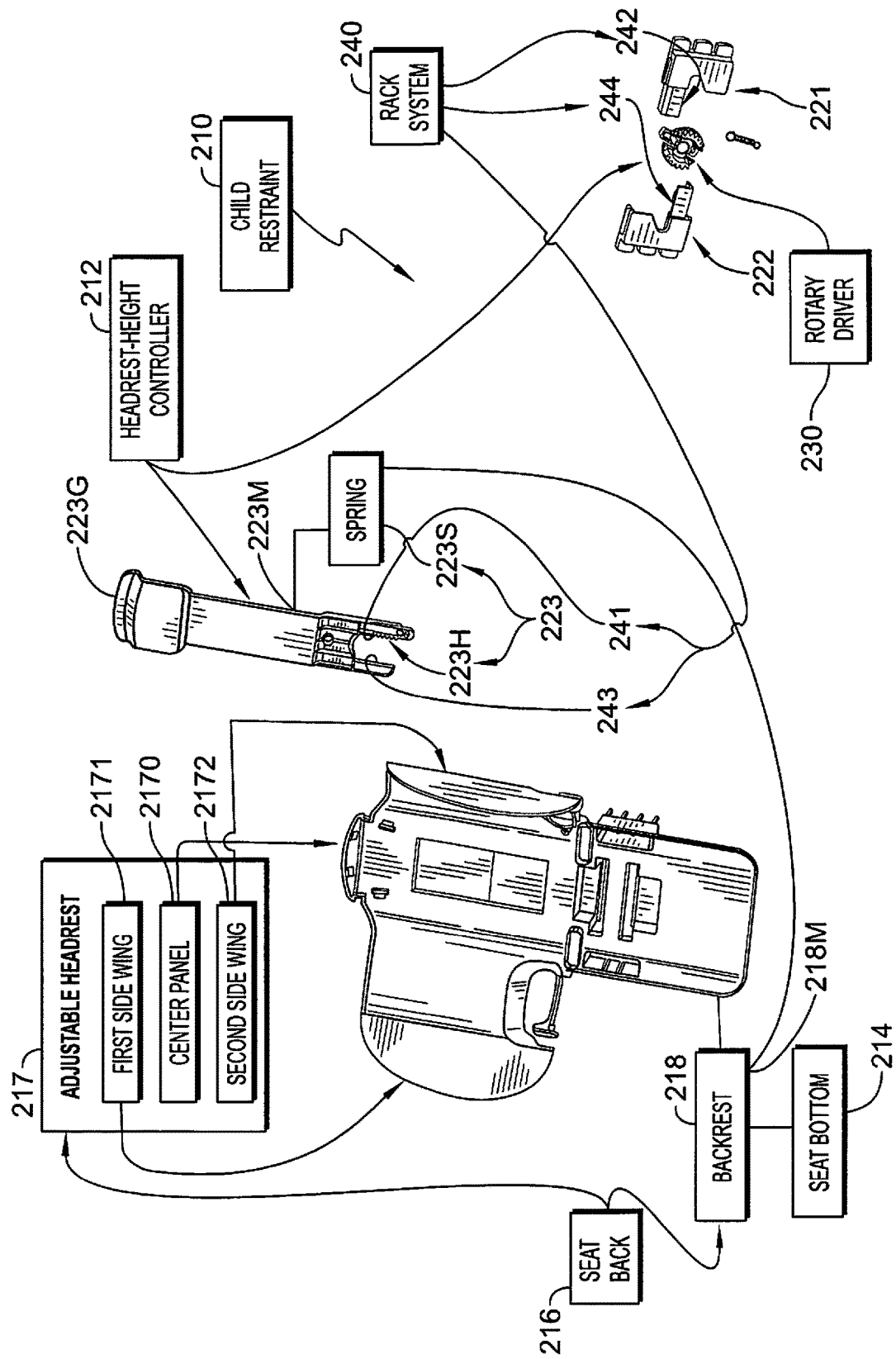
FIG. 4 is a diagrammatic view of a child restraint including a front exploded perspective assembly view of the adjustable headrest and the headrest-height controller of FIG. 3 showing that the adjustable headrest includes a center panel flanked by oppositely extending first and second side wings and suggesting that the headrest-height controller is adapted to be mounted on the center panel of the adjustable headrest as shown in FIG. 3 and showing that the headrest-height controller includes a rotary driver interposed between two slidable headrest-motion blockers.

Mover activator 223 includes an activation handle 223H and a return spring 223S as suggested in FIG. 4. Activation handle 223H can be gripped by a caregiver and is mounted for up-and-down movement relative to adjustable headrest 217 and to the headrest-supporting backrest 218. Return spring 223S is coupled to activation handle 223H and to the headrest-supporting backrest 218 as suggested diagrammatically in FIG. 6 and is configured to normally and yieldably urge activation handle 223H from a RAISED position associated with the HEADREST-UNLOCKING mode of headrest-height controller 212 and shown in FIG. 7 to a LOWERED position associated with the HEADREST-LOCKING mode of headrest-height controller 212 and shown in FIG. 11.

Figure 6:
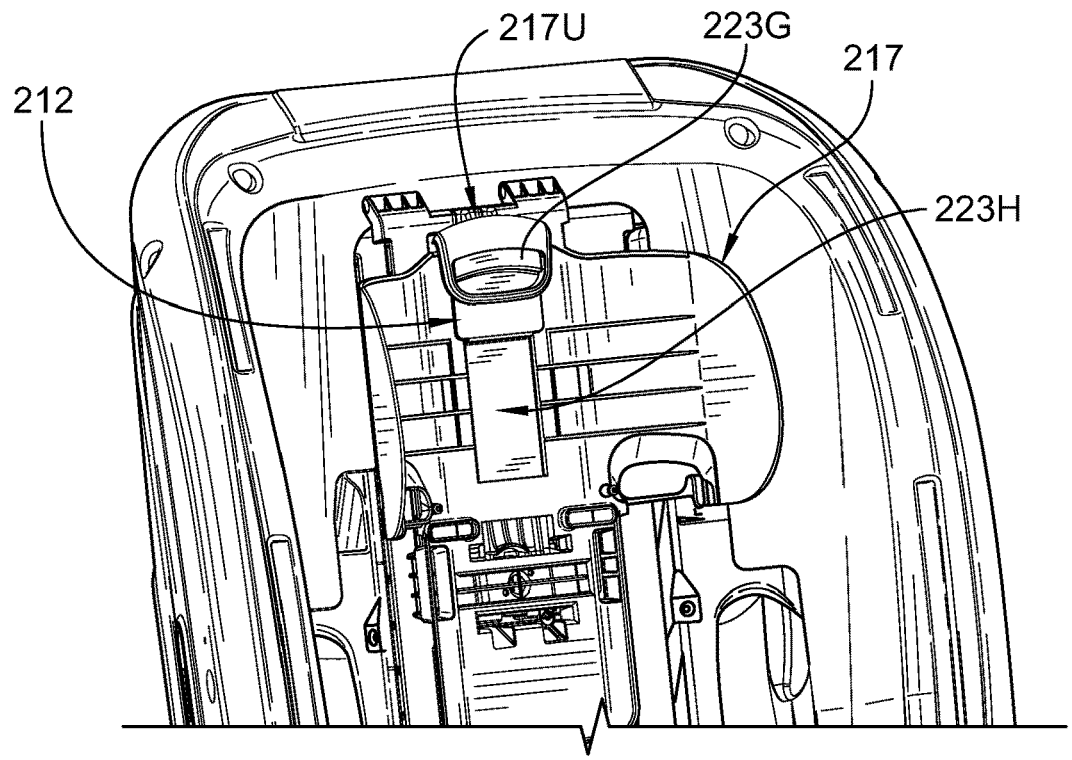
FIG. 6 is a front perspective view of the adjustable headrest and the headrest-height controller of FIGS. 3-5 mounted on the backrest and showing the headrest-height controller in a HEADREST-LOCKING MODE to block up-and-down movement of the headrest relative to the adjacent headrest-supporting backrest so that a selected headrest elevation position of the adjustable headrest relative to an underlying seat bottom is established.
Figure 14:
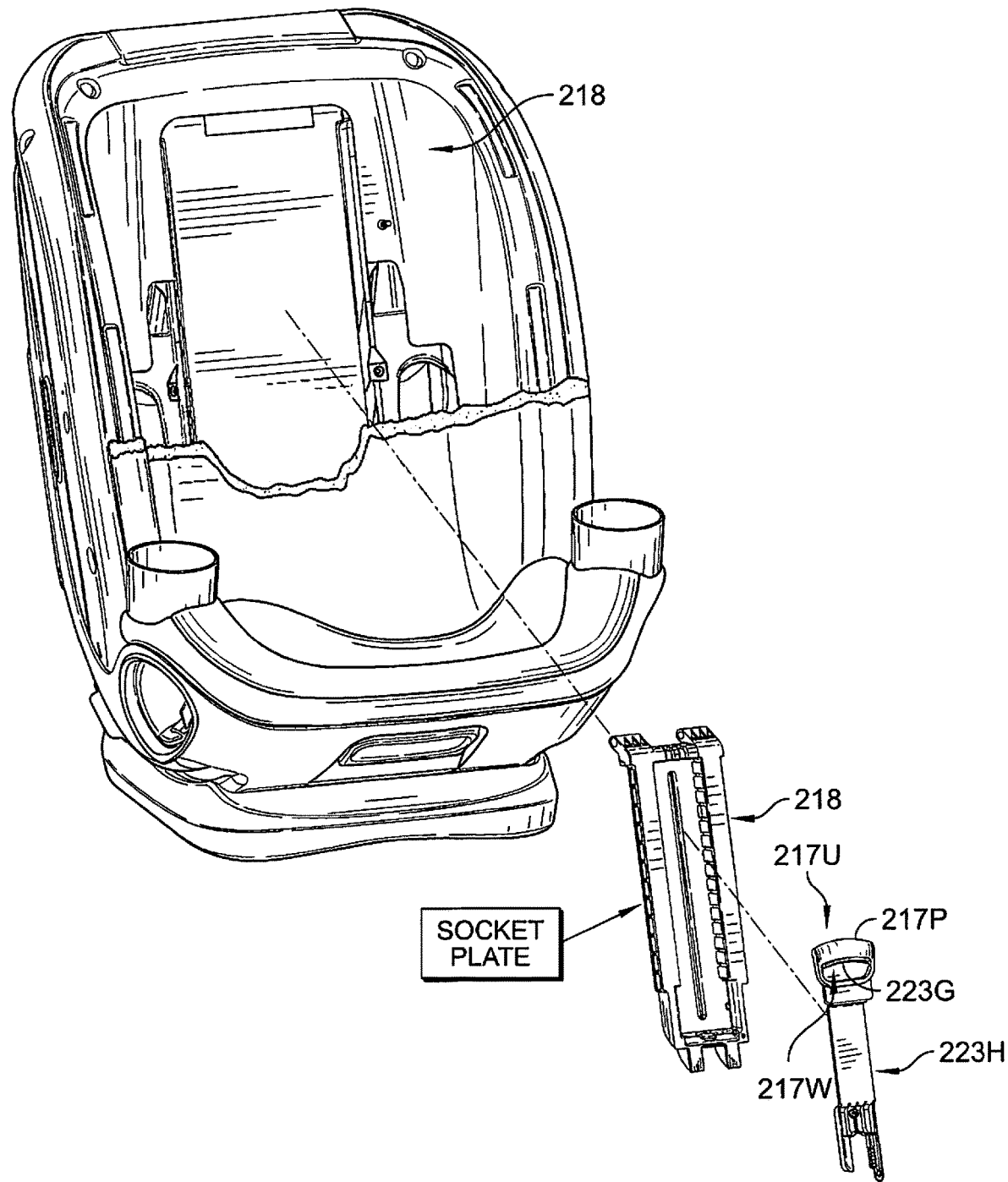
FIG. 14 is an exploded perspective assembly view showing that a socket plate is formed to include many vertically spaced sets of opposing blocker-receiver sockets and configured to be mounted on a shell included in the child restraint and that the activation handle is sized and shaped to fit into the socket plate.
Figure 15:
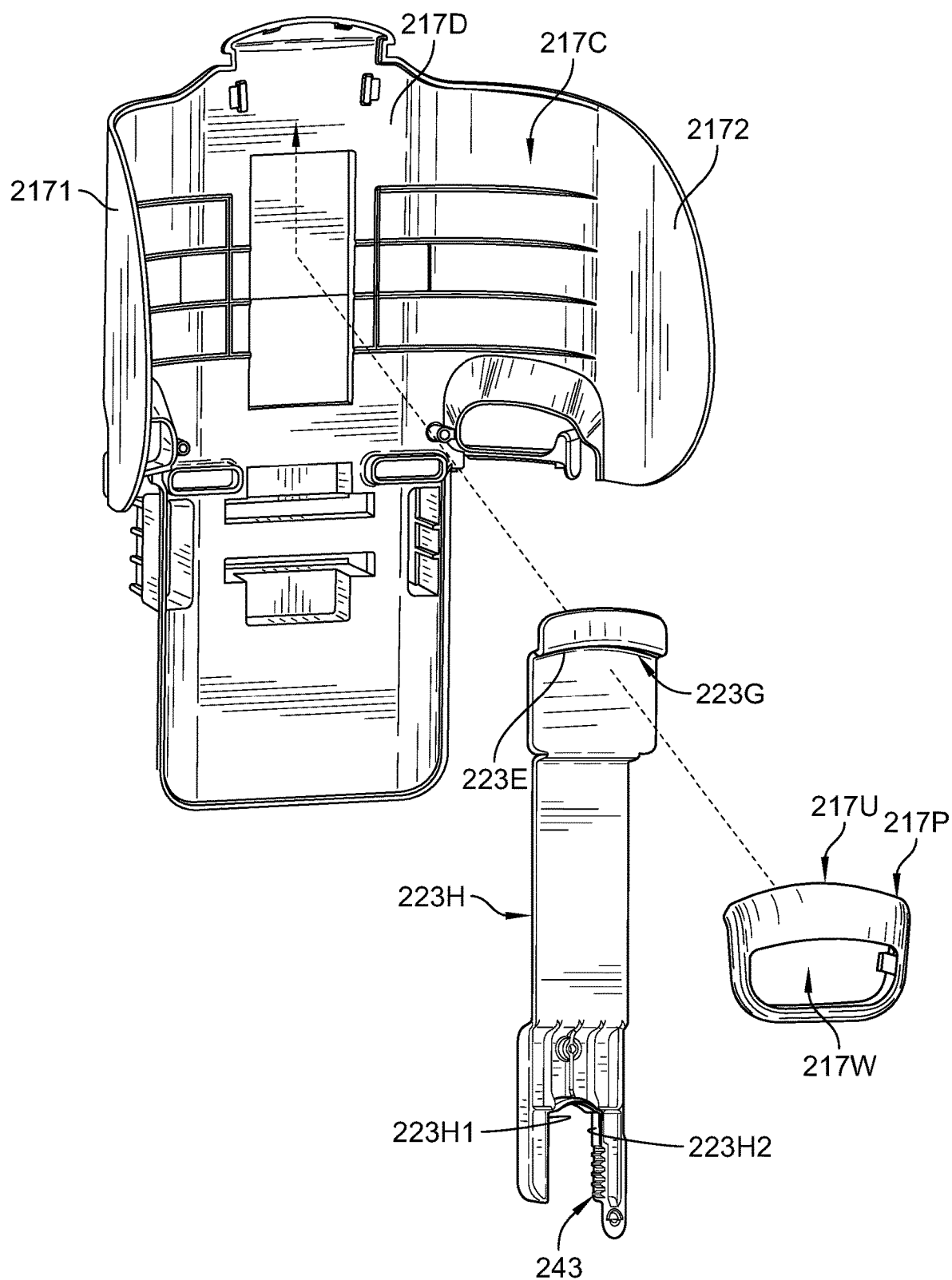
FIG. 15 is an exploded perspective assembly view showing that the adjustable headrest is sized to mate with the activation handle.

Activation handle 223H of mover activator 223 of headrest-height controller 212 is mounted for up-and-down sliding movement relative to backrest 218 and to adjustable headrest 217 as suggested in FIGS. 6 and 10. An upper portion 217U of adjustable headrest 217 is formed to include a forward-facing handgrip window 217W that will be visible to a caregiver facing toward a front side 217F of adjustable headrest 217 as shown in FIGS. 2A, 14, and 15. An upper end of activation handle 223H includes an operator handgrip 223G that has a downwardly facing bottom edge 223E as shown in FIG. 15 that is adapted to be engaged by fingers of the caregiver and that is exposed in the forward-facing handgrip window 217W to be seen and touched by the caregiver when activation handle 223H is urged downwardly to a LOWERED position by return spring 223S shown in FIG. 2A.

As suggested in FIG. 4, an upper end of return spring 223S is coupled to a first spring mount 223M included in a lower end of activation handle 223H. A lower end of the return spring 223S is coupled to a second spring mount 218M included in a portion of backrest 218 as suggested in FIG. 4.

Adjustable headrest 217 includes a center panel 2170 flanked by oppositely extending first and second side wings 2171, 2172 as shown in FIG. 4. Headrest-height controller 212 is adapted to be mounted on center panel 2170 of adjustable headrest 217 for up-and-down movement therewith relative to backrest 218 as suggested in FIGS. 1A, 1B, and 3.

Headrest-height controller 212 includes a headrest lock 220, a headrest-lock mover 224, and a mover activator 223 as suggested in FIG. 5. Headrest lock 220 includes slidable first and second headrest-motion blockers 221, 222. Headrest-lock mover 224 provides a two-gear rack-and-pinion system that includes a main first-gear rack 242 on first headrest-motion blocker 221, another auxiliary first-gear rack 244 on second headrest-motion blockers 222, a second-gear rack 243 on activation handle 223H included in lock-mover activator 223, and a rotary driver 230 having a first motion-transfer gear 231 engaging the two main and auxiliary first-gear racks 242, 244 associated with the first and second headrest-motion blockers 221, 222 and a second motion-transfer gear 232 engaging the second-gear rack 243 associated with the activation handle 223H. Activation handle 223H of mover activator 223 can be gripped at an upper end 223U thereof by a caregiver and moved relative to backrest 218 and headrest 217 to activate the two-gear rack-and-pinion system provided by headrest-lock mover 224.

An enlarged perspective view of rotary driver 230 is provided in FIG. 5A to show that rotary driver 230 includes a first motion-transfer gear 231 on the right, a second motion-transfer gear 232 on the left, and a cylinder-shaped gear mount 233 arranged to lie between and interconnect the two motion-transfer gears 231, 232 so that they will rotate in the same direction about a common axis of rotation 230A.

Figure 6A:
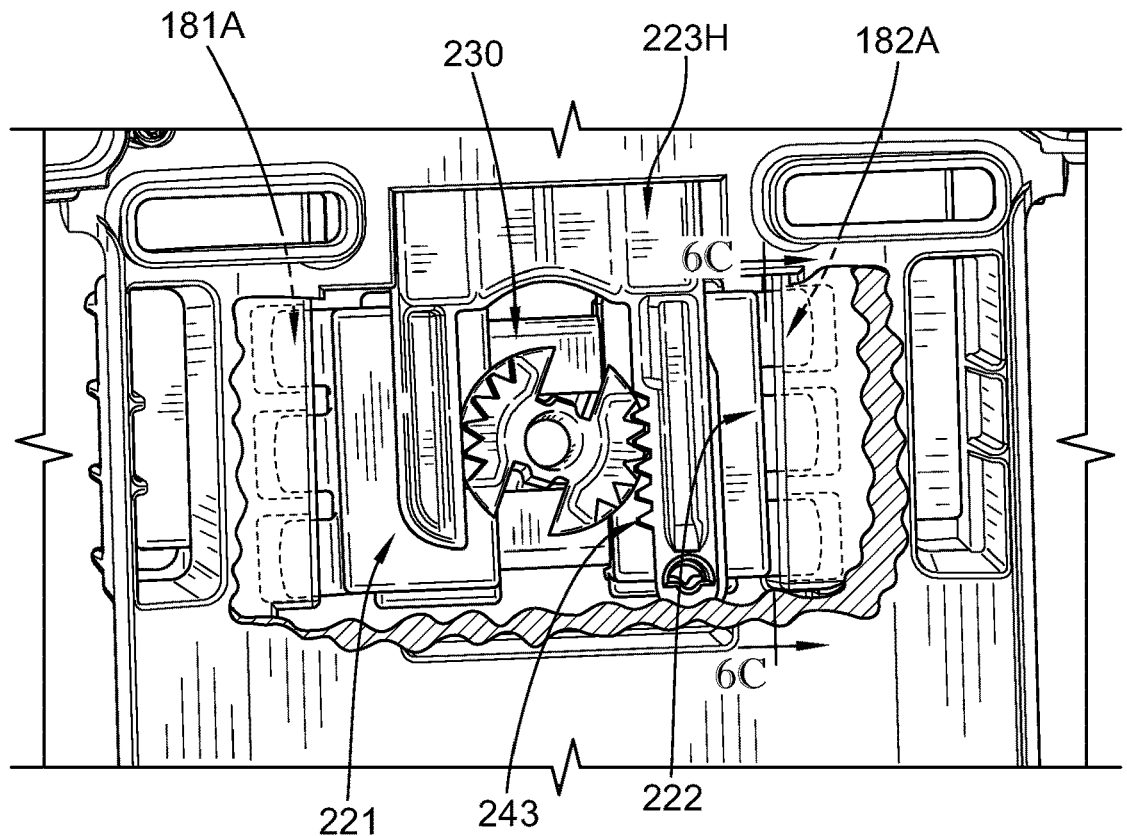
FIG. 6A is an enlarged rear view of a portion of the child restraint shown in FIG. 6 showing engagement of the rotary gear with gear racks included in the activation handle and suggesting that the first headrest-motion blocker (on the left) is extended outwardly by the rotary driver into a companion blocker-receiver socket formed in the backrest and that the second headrest-motion blocker (on the right) is extended outwardly by the rotary driver into a companion blocker-receiver socket formed in the backrest when the headrest-height controller is placed in the HEADREST-LOCKING MODE.
Figure 6B:
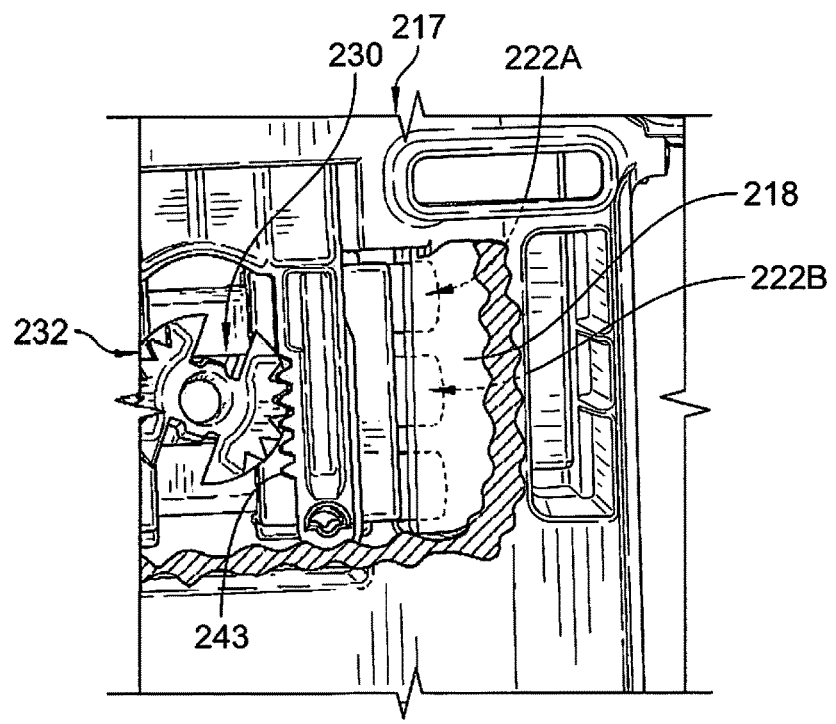
FIG. 6B is a view similar to FIG. 6A with portions broken away to show the two outwardly projecting cantilevered tabs of the second headrest-motion blocker in companion blocker-receiver sockets.
Figure 6C:
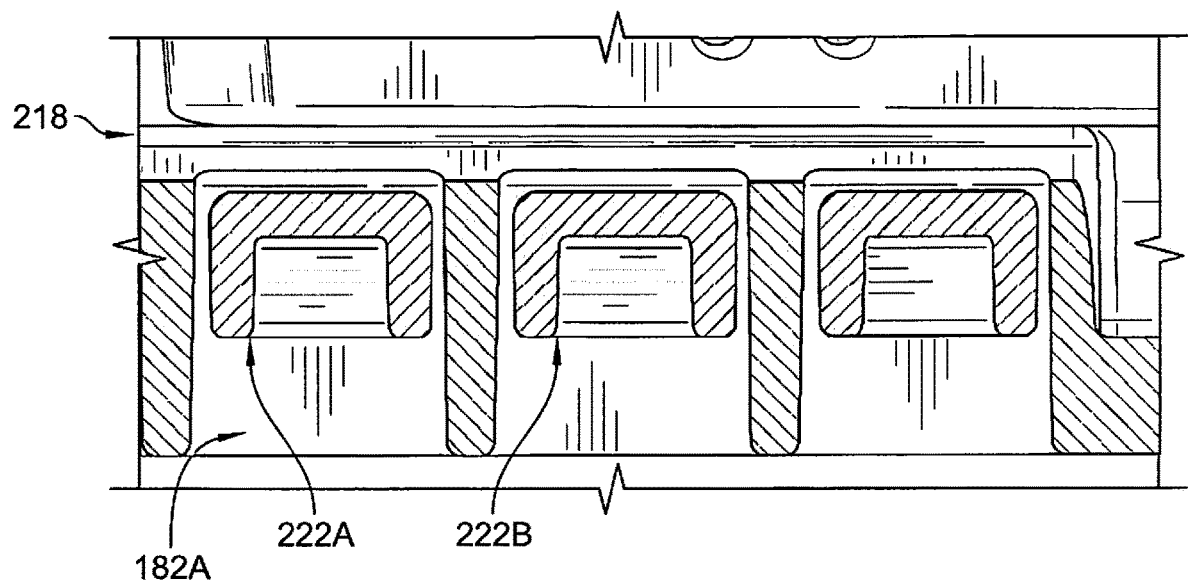
FIG. 6C is an enlarged sectional view taken along line 6C-6C of FIG. 6A showing that each of the cantilevered tabs is extended into a companion socket formed in the backrest in the HEADREST-LOCKING MODE of headrest-height controller.

As shown in FIG. 6-6C, headrest-height controller 212 has been placed in a HEADREST-LOCKING MODE to block up-and-down movement of headrest 217 relative to an adjacent headrest-supporting backrest 218 so that a selected elevation of headrest 217 relative to an underlying seat bottom 214 is established. Rotary driver 230 included in headrest-lock mover 224 of headrest-height controller 212 has been rotated about an axis of rotation 230A by activation handle 223H of mover activator 223 as shown in FIG. 6A-6C (and diagrammatically in FIG. 7) to move first and second headrest-motion blockers 221, 222 laterally away from one another to extend into companion opposing blocker-receiver sockets 181A, 182A formed in the adjacent headrest-supporting backrest 218.

Figure 8:
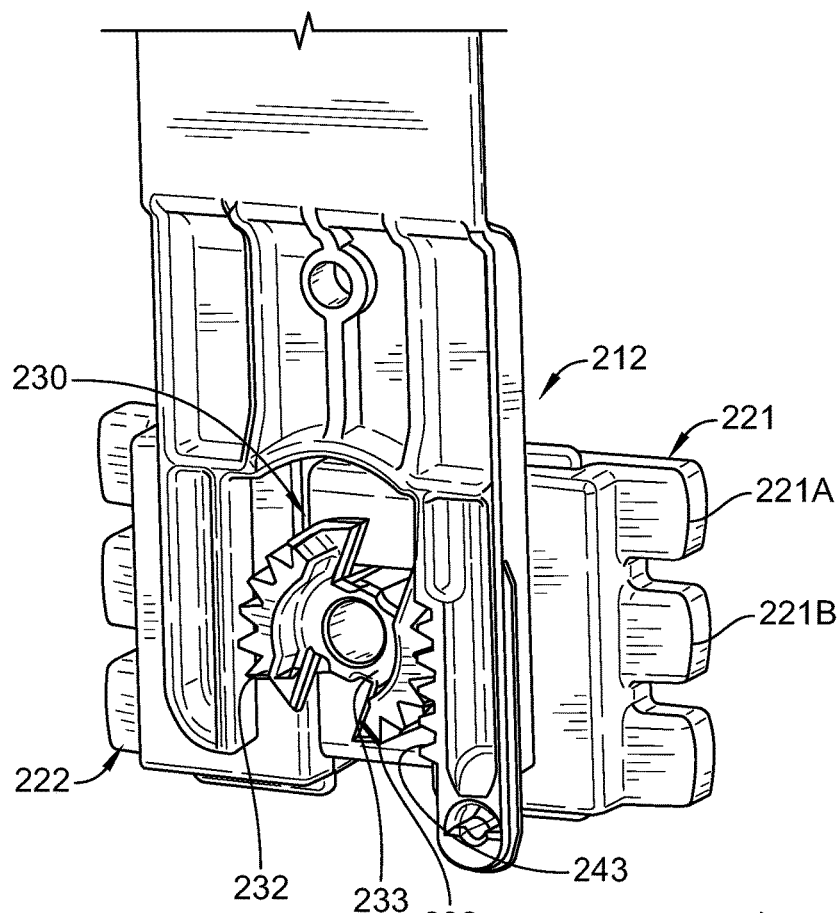
FIG. 8 is an enlarged front perspective view of a lower portion of the headrest-height controller of FIGS. 3-7 showing the first and second headrest-motion blockers in their motion-blocking extended positions and showing extension of a forward-facing first motion-transfer gear of the rotary driver into a driver-receiving slot formed in a lower end of the activation handle and showing meshing engagement of the forward-facing first motion-transfer gear with the two opposing main and auxiliary first-gear racks that are coupled to a lower end of the activation handle and arranged to lie in spaced-apart relation to one another so as to help establish a rack-and-pinion driving connection between the activation handle and the first and second headrest-motion blockers.

First and second headrest-motion blockers 221, 222 are shown in their motion-blocking extended positions in FIG. 8. A forward-facing second motion-transfer gear 232 of rotary driver 230 into a driver-receiving slot 230A formed in a lower end of activation handle 223H. The forward-facing second motion-transfer gear 232 is meshingly engaged with the second-gear rack 243 that are coupled to a lower end of activation handle 223H. The second-gear rack 243 engage the forward-facing second motion-transfer gear 232 so as to help establish a two-gear rack-and-pinion driving connection between activation handle 223H and first and second headrest-motion blockers 221, 222 as suggested in FIG. 8.

Figure 9:
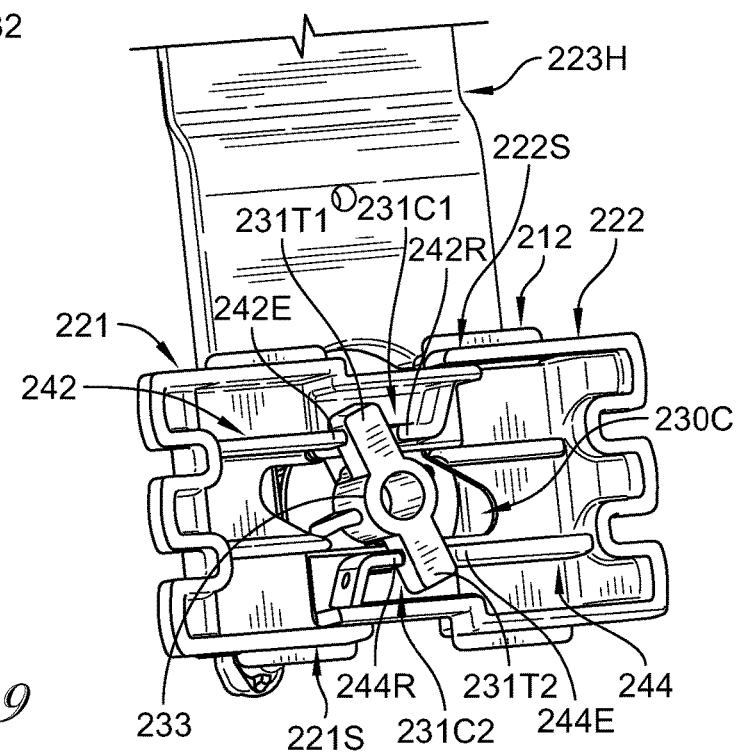
FIG. 9 is a rear perspective view of the assembly shown in FIG. 8 showing extension of a rearward-facing second motion-transfer gear of the rotary driver into a driver-receiving channel defined between a horizontally extending first rack-support strip included in the first headrest-motion blocker and a horizontally extending second rack-support strip included in the second headrest-motion blocker and showing meshing engagement of the second motion-transfer gear of the rotary driver and (1) one main second-gear rack coupled to the first rack-support strip of the first headrest-motion blocker and (2) another auxiliary second-gear rack coupled to the second rack-support strip of the main second headrest-motion blocker and arranged to lie in opposing laterally spaced-apart relation to the one second-gear rack to help establish the rack-and-pinion driving connection between the activation handle and the first and second headrest-motion blockers.

A rearward-facing first motion-transfer gear 231 of rotary driver 230 is extended into a driver-receiving channel 230C defined between a horizontally extending first rack-support strip 221S included in first headrest-motion blocker 221 and a horizontally extending second rack-support strip 222S included in second headrest-motion blocker 222 as shown in FIG. 9. First motion-transfer gear 231 of the rotary driver 230 is engaged with (1) one main first-gear rack 242 coupled to the first rack-support strip 221S of first headrest-motion blocker 221 and (2) another auxiliary first-gear rack 244 coupled to the second rack-support strip 222S of second headrest-motion blocker 222 and arranged to lie in opposing laterally spaced-apart relation to the main first-gear rack 242 also to help establish the two-gear rack-and-pinion driving connection between activation handle 223H and first and second headrest-motion blockers 221, 222.

Headrest-height controller 212 is shown in a HEADREST-UNLOCKING mode in FIGS. 10 and 10A to free headrest 217 for up-and-down movement relative to the adjacent headrest-supporting backrest 218 after the caregiver has gripped an operator grip 223G included in activation handle 223H and raised activation handle 223H in an upward direction against a spring force generated by return spring 223S. As suggested in FIGS. 10A and 11, rotary driver 230 included in headrest-lock mover 224 of headrest-height controller 212 has been rotated about its axis of rotation 230A by the raised activation handle 223H of mover activator 223 to move first and second headrest-motion blockers 221, 222 laterally inwardly toward one another to exit the companion opposing blocker-receiver sockets 181A, 182A (shown diagrammatically in FIG. 12) formed in the adjacent headrest-supporting backrest 217.

Figure 13:
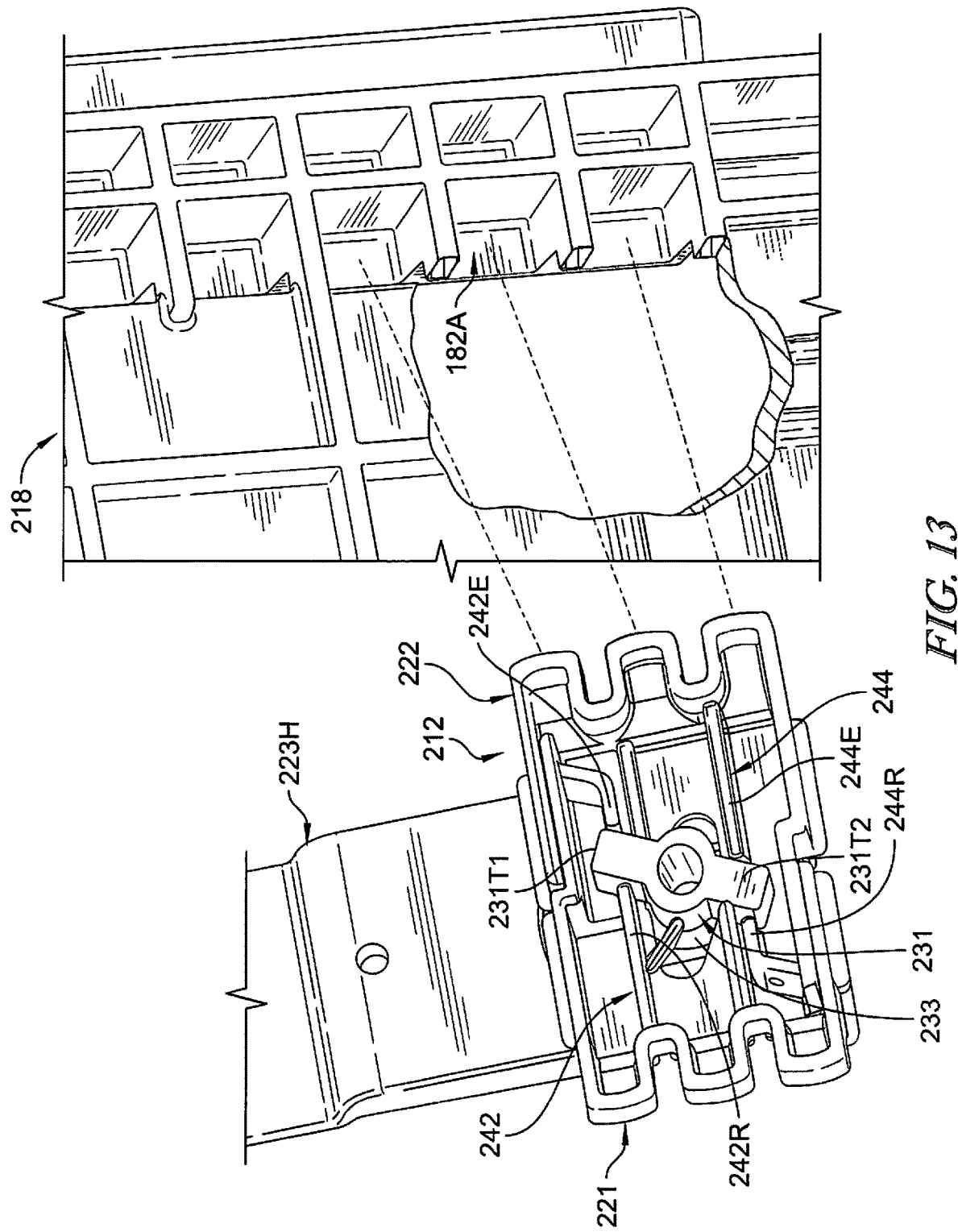
FIG. 13 is a rear perspective view of the assembly shown in FIG. 12 and is similar to FIG. 9 but showing that the rearwardly extending second motion-transfer gear has been rotated as a result of upward movement of the activation handle relative to the backrest to cause the first and second headrest-motion blockers to move laterally toward one another to assume their motion-allowing retracted positions to withdraw the two outwardly projected cantilevered tabs included in the second headrest-motion blocker from companion blocker-receiver sockets formed in the backrest during rotation of the rotary driver about its axis of rotation in response to vertical movement of the activation handle relative to the backrest.

First and second headrest-motion blockers 221, 222 are shown in their motion-allowing RETRACTED positions in FIGS. 10A and 11. The rearwardly extending first motion-transfer gear 231 has been rotated as a result of upward movement of activation handle 223H relative to backrest 217 to cause first and second headrest-motion blockers 221, 222 to move laterally inwardly toward one another to assume their motion-allowing RETRACTED positions as shown in FIG. 13.

In use, headrest 217 is locked to backrest 218 in the HEADREST-LOCKING mode to remain in one of several predetermined headrest elevation positions in the following manner. When headrest 217 is moved upwardly or downwardly on backrest 218 by the caregiver to reach a desired headrest elevation position on backrest 218, the two companion headrest-motion blockers 221, 222 of headrest lock 220 are positioned to lie between the two opposing blocker-receiver sockets that correspond to the desired headrest elevation position. At that point, first and second headrest-motion blockers 221, 222 are moved away from one another by spring forces generated by a return spring 223S included in headrest-height controller 212 to cause first headrest-motion blocker 221 to extend laterally outwardly in one direction into a first blocker-receiver socket and a second headrest-motion blocker 222 to extend laterally outwardly in an opposite second direction into a companion opposing second blocker-receiver socket to lock the adjustable headrest 217 to the backrest 218 at a selected headrest elevation position above seat bottom 214 and place headrest-height controller 212 in the HEADREST-LOCKING mode.

In use, headrest 217 is unlocked in the following manner. To free the adjustable headrest 217 for up-and-down movement on backrest 218 and place headrest-height controller 212 in the HEADREST-UNLOCKING mode, the caregiver uses activation handle 223H of mover activator 223 of headrest-height controller 212 to actuate the rack-and-pinion system included in headrest-lock mover 224 to cause first and second headrest-motion blockers 221, 222 to move toward one another against spring forces generated by return spring 223S and exit the opposing blocker-receiver sockets formed in backrest 218 so that the adjustable headrest 217 is no longer locked to backrest 218 and is free to be moved upwardly or downwardly on backrest 218 by the caregiver to a new headrest elevation position relative to seat bottom 214.

In illustrative embodiments, a return spring 223S is included in the mover activator 223 of headrest-height controller 212 along with activation handle 223H. Return spring 223S is arranged to cause the two movable headrest-motion blockers 221, 222 normally to move outwardly away from one another into one of the several sets of companion blocker-receiver sockets that are formed in backrest 218 when headrest 217 is moved by the caregiver to reach a desired headrest elevation position and the blockers and sockets are aligned so that up-and-down movement of headrest 217 relative to backrest 218 is blocked.

In illustrative embodiments, an operator handgrip 223G is included activation handle 223H of mover activator 223 of headrest-height controller 212 and is located in an EXPOSED position adjacent to an upper portion of the adjustable headrest 217 as shown in FIGS. 2A and 6. A caregiver applies a lifting force to operator handgrip 223G of activation handle 223H to activate headrest-lock mover 224 and thereby cause the pair of headrest-motion blockers 221, 222 to move laterally toward one another against the spring forces generated by return spring 223S to exit the blocker-receiver sockets formed in backrest 218 so as to free the adjustable headrest 217 for up-and-down movement on backrest 218 relative to seat bottom 214. One end of return spring 223S is coupled to activation handle 223H of mover activator 223 and another end of return spring 223S is coupled to backrest 18. Return spring 223S is arranged normally to urge the activation handle 223H downwardly to a LOWERED position relative to backrest 218 to cause the headrest-motion blockers 221, 222 to move away from one another.

Child restraint 210 comprises a seat bottom 214, a seat back 216, and a headrest-height controller 212 as suggested in FIGS. 1A-1C. Seat back 216 includes a backrest 218 arranged to extend upwardly from seat bottom 214 and an adjustable headrest 217 mounted for up-and-down movement on backrest 218 between a LOWERED position located at a first distance from seat bottom 214 and a RAISED position located at a relatively higher second distance from seat bottom 214 to accommodate and seat children of different sizes.

Headrest-height controller 212 is mounted on the adjustable headrest 217 for up-and-down with the adjustable headrest 217 relative to backrest 218. Headrest-height controller 212 includes a headrest lock 220, a mover activator 223, and a headrest-lock mover 224 as suggested in FIGS. 1A-1C. Headrest lock 220 is arranged to move relative to seat bottom 214 to engage and disengage backrest 218 to control up-and-down movement of the adjustable headrest 217 between the LOWERED and RAISED positions. Mover activator 223 includes an activation handle 223H mounted on the adjustable headrest 217 for up-and-down movement relative to the adjustable headrest 217 and backrest 218. Headrest-lock mover 224 is arranged to move headrest lock 220 relative to backrest 218 to disengage backrest 218 to free the adjustable headrest 217 to move up and down relative to backrest 218 in response to upward movement of activation handle 223H relative to backrest 218 and away from seat bottom 214 and to engage backrest 218 to retain headrest 217 in a selected one of the LOWERED and RAISED positions in response to downward movement of the adjustable headrest 217 relative to backrest 218 and toward seat bottom 214 upon arrival of the adjustable headrest 217 at such a selected one of the LOWERED and RAISED positions and during downward movement of activation handle 217 relative to backrest 218.

Backrest 218 is formed to include a lower set of opposing first and second blocker-receiver sockets 181A, 182A located at a first height above seat bottom 214 to align with the LOWERED position of the adjustable headrest 217 and an upper set of first and second opposing blocker-receiver sockets 181A, 182A located at a relatively higher second height above seat bottom 214 to align with the RAISED position of the adjustable headrest 217 as suggested in FIG. 1C. Headrest lock 220 includes a first headrest-motion blocker 221 that is constrained to move laterally relative to the adjustable headrest 217 (1) to extend into the first blocker-receiver socket 181A of the lower set to engage backrest 218 in response to application of an outward movement-inducing force applied to first headrest-motion blocker 221 by headrest-lock mover 224 when the adjustable headrest 217 is located in the LOWER position and activation handle 223H is moved downwardly relative to backrest 218 and toward seat bottom 214 to establish a HEADREST-LOCKING MODE of headrest-height controller 212 and (2) to withdraw from the first blocker-receiver socket 181A of the lower set to disengage backrest 218 in response to application of an inward movement-inducing force applied to first headrest-motion blocker 221 by headrest-lock mover 224 when the adjustable headrest 217 is located in the LOWER position and activation handle 223H is moved upwardly relative to backrest 218 and away from seat bottom 214 to establish a HEADREST-UNLOCKING MODE of headrest-height controller 212.

Headrest-lock mover 224 includes a driver-engagement rack (first-gear) 242 coupled to first headrest-motion blocker 221 as shown in FIG. 5. Headrest-lock mover 224 also includes a rotary driver 230 mounted for rotation relative to backrest 218 to convert motion of activation handle 223H relative to backrest 218 into motion of first headrest-motion blocker 221 relative to backrest 218 owing to meshing engagement of teeth in rotary driver 230 with the main driver-engagement rack 242 to cause the outward and inward movement-inducing forces to be applied to first headrest-motion blocker 221 in response to movement of activation handle 223H relative to backrest 218.

Mover activator 223 of headrest-height controller 212 further includes a return spring 223S as suggested in FIG. 4. Return spring 223S is coupled to each of activation handle 223H and backrest 218 and biased normally and yieldably to urge activation handle 223H to move downwardly relative to backrest 218 and toward seat bottom 214 to rotate rotary driver 230 included in headrest-lock mover 224 owing to meshing engagement of the main driver-engagement rack (second-gear) 243 coupled to activation handle 223H and teeth in rotary driver 230 so that rotation of rotary driver 230 moves first headrest-motion blocker 221 relative to backrest 218 to extend into first blocker-receiver socket 181A of the lower set owing to meshing engagement of the teeth in rotary driver 230 with the main driver-engagement (first-gear) rack 242 coupled to first headrest-motion blocker 221 as rotary driver 230 rotates relative to backrest 218.

Headrest lock 220 further includes a second headrest-motion blocker 222 as suggested in FIG. 5. Second headrest-motion blocker 222 is constrained to move laterally relative to the adjustable headrest 217 laterally away from the first headrest-motion blocker 221 to (1) extend into the second blocker-receiver socket 182 of the lower set to engage backrest 218 in response to application of an outward movement-inducing force applied to second headrest-motion blocker 222 by headrest-lock mover 224 when the adjustable headrest 217 is located in the LOWER position and activation handle 223H is moved downwardly relative to backrest 218 and toward seat bottom 214 to establish a HEADREST-LOCKING MODE of headrest-height controller 212 and (2) to withdraw from the second blocker-receiver socket 182A of the lower set to disengage backrest 218 in response to application of an inward movement-inducing force applied to second headrest-motion blocker 222 by headrest-lock mover 224 when the adjustable headrest 217 is located in the LOWER position and activation handle 223H is moved upwardly relative to backrest 218 and away from seat bottom 214 to establish a HEADREST-UNLOCKING MODE of headrest-height controller 212.

Headrest-lock mover 224 further includes one auxiliary driver-engagement (second-gear) rack 243 coupled to activation handle 223H and another auxiliary driver-engagement (first-gear) rack 244 coupled to second headrest-motion blocker 222 as suggested in FIG. 5. Rotary driver 230 is mounted for rotation relative to backrest 218 to convert motion of activation handle 223H relative to backrest 218 into motion of second headrest-motion blocker 222 relative to backrest 218 owing to meshing engagement of teeth in rotary driver 230 with the auxiliary driver-engagement racks 243, 244 to cause outward and inward movement-inducing forces to be applied to second headrest-motion blocker 222 in response to movement of activation handle 223H relative to backrest 218.

Rotary driver 230 comprises a first motion-transfer gear 231, a second motion-transfer gear 232, and a gear mount 233 as suggested in FIG. 5A. Gear mount 233 is arranged to lie between and interconnect the first and second motion-transfer gears 231, 232 so that first and second motion-transfer gears 231, 232 rotate in the same direction about a common axis of rotation 230A relative to backrest 218. First motion-transfer gear 231 includes teeth that mesh with the main driver-engagement rack 242 that are coupled to activation handle 223H and to first headrest-motion blocker 221 during rotation of first motion-transfer gear 231 about the common axis of rotation 230A. Second motion-transfer gear 232 includes teeth that mesh with the driver-engagement racks 243, 244 that are coupled to activation handle 223H and to second headrest-motion blocker 222 during rotation of the second motion-transfer gear 232 about the common axis of rotation 230A.

Figure 10B:
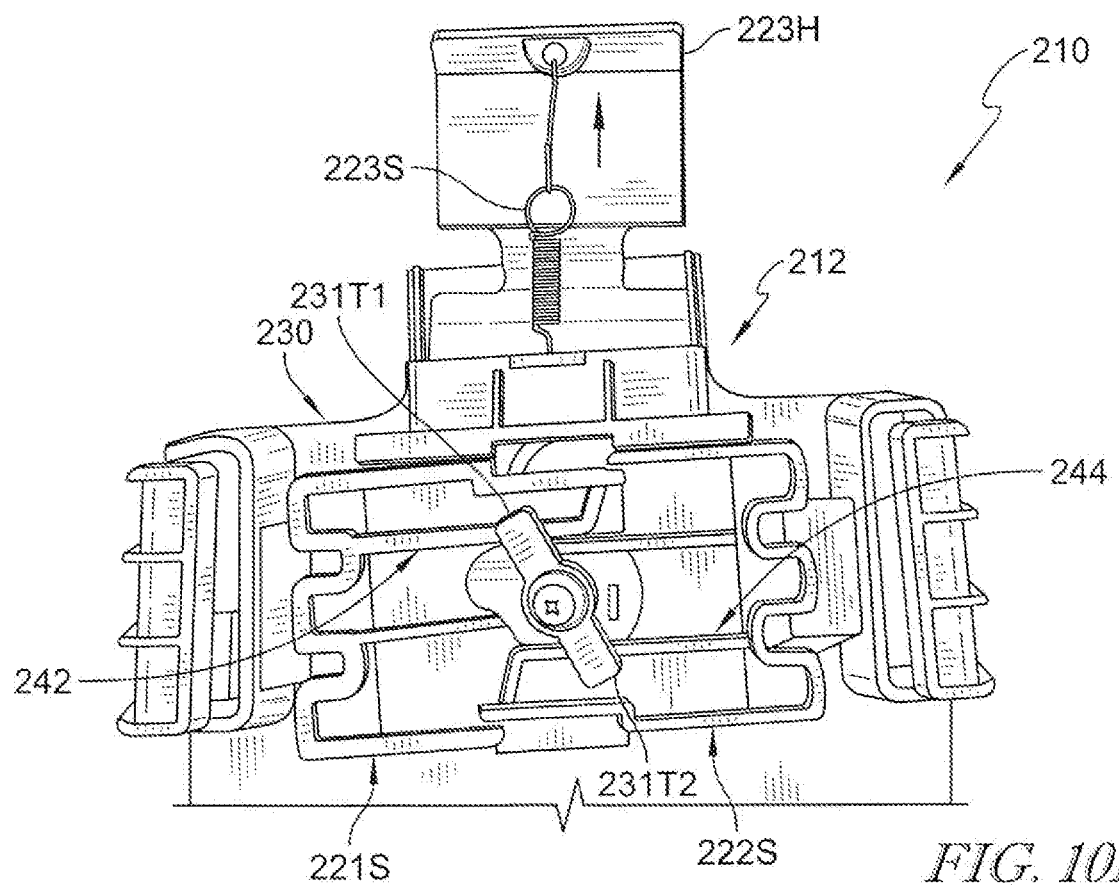
FIGS. 10B and 10C are illustrative views of a rotary driver in accordance with the present disclosure engaged to the first and second headrest-motion blockers.
Figure 10C:
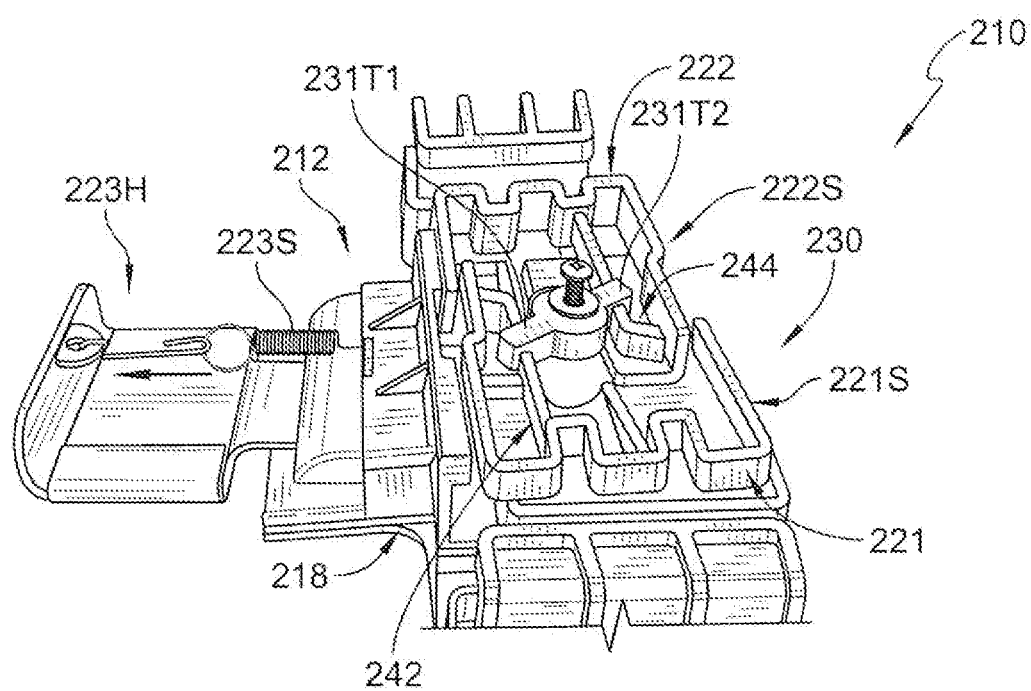

Activation handle 223H includes a first inner edge 223H1 facing toward the second blocker-receiver socket 182A of the lower set and an opposite second inner edge 223H2 facing toward the first inner edge and the first blocker-receiver socket 181A of the lower set as suggested in FIG. 10A. The one auxiliary driver-engagement (second-gear) rack 243 of headrest-lock mover 224 is coupled to the opposite second inner edge 223H2 of activation handle 223H as shown in FIG. 10A to engage teeth in second motion-transfer gear 232. First headrest-motion blocker 221 includes a first rack-support strip 221S having an upwardly facing surface facing away from seat bottom 214 as suggested in FIGS. 7 and 11. The main drive-engagement (first-gear) rack 242 of headrest-lock mover 224 is coupled to the downwardly facing surface of the first rack-support strip 221S to engage the single first-gear tooth 231T1 in first motion-transfer gear 231 as suggested in FIGS. 7, 10B, and 11. The second headrest-motion blocker 222 includes a second rack-support strip 222S having a downwardly facing surface facing toward seat bottom 214. The another auxiliary drive-engagement rack 244 of headrest-lock mover 224 is coupled to the upwardly facing surface of the second rack-support strip 222S to engage the single second gear tooth 231T2 in the first motion-transfer gear 231 as suggested in FIGS. 7, 10B, and 11.

The adjustable headrest 217 includes a head cradle 217C configured to receive a head of a child seated on seat bottom 214 and a palm-grip portion 217P coupled to an upper portion of head cradle 217C and formed to include a forward-facing handgrip window 217W that will be visible to a caregiver facing a front side of the head cradle 217C and an upper end of activation handle 223H includes an operator fingergrip that has a downwardly facing bottom edge 223E that is adapted to engaged by finger tips of a hand of a caregiver while a palm of that hand rests on an upwardly facing outer palm-support surface of palm-grip portion 217P of the adjustable headrest 217 and that is exposed in the forward-facing window 217W to be seen and touched by the caregiver when activation handle 223H is urged downwardly relative to backrest 218 by a spring force generated by return spring 223S and applied to activation handle 223H.

The downwardly facing bottom edge 223E of the operator fingergrip moves upwardly in the forward-facing handgrip window 217W formed in the palm-grip portion 217P of the adjustable headrest 217 in a direction away from seat bottom 214 to move activation handle 223H relative to backrest 218 and against a spring force generated by return spring 223S in response to application of an upwardly directed movement-inducing force applied to the downwardly facing bottom edge 223E of the operator fingergrip by fingertips of an operator while a palm of the operator is at rest on the upwardly facing palm-support surface of the palm-grip portion 217P of the adjustable headrest 217.

The main driver-engagement (first-gear) rack 242 that is coupled to first headrest-motion blocker 221 includes an outer blocker-extending surface 242E and a companion inner blocker-retracting surface 242R which cooperate to define therebetween a first gear-tooth receiver channel 231C1 as suggested in FIGS. 9 and 13. Rotary driver 230 includes a single first gear tooth 231T1 provided in first motion-transfer gear 231 and shown in FIG. 5A and arranged to extend into the first gear-tooth receiver channel 231C1 and (1) to move outwardly to engage the blocker-extending surface 242E to apply a movement-inducing force to the main driver-engagement (first-gear) rack 242 to cause first headrest-motion blocker 221 to move relative to backrest 218 to extend into the first blocker-receiver socket 181A during rotation of rotary driver 230 in a first direction relative to backrest 212 to establish a HEADREST-LOCKING MODE of headrest-height controller 212 and (2) to move inwardly to engage the blocker-retracting surface 242R of the another driver-engagement rack 242 coupled to first headrest-motion blocker 221 to apply a movement-inducing force to the main driver-engagement (first-gear) rack 242 to cause first headrest-motion blocker 221 to move relative to backrest 218 to withdraw from the first blocker-receiver socket 181A during rotation of rotary driver 230 in an opposite second direction relative to backrest 218 to establish a HEADREST-UNLOCKING MODE of headrest-height controller 212.

Headrest lock 220 further includes a second headrest-motion blocker 222. Second headrest-motion blocker 222 is constrained to move laterally relative to the adjustable headrest 217 and laterally away from first headrest-motion blocker 22 to extend into the second blocker-receiver socket 182A of the lower set to engage backrest 218 in response to application of an outward movement-inducing force applied to second headrest-motion blocker 222 by headrest-lock mover 224 when the adjustable headrest 217 is located in the lower position and activation handle 223H is moved downwardly relative to backrest 218 and toward seat bottom 214 to establish a HEADREST-LOCKING MODE of headrest-height controller 212 and to withdraw from the second blocker-receiver socket 182A of the lower set to disengage backrest 218 in response to application of an inward movement-inducing force applied to second headrest-motion blocker 222 by headrest-lock mover 224 when adjustable headrest 217 is located in the lower position and activation handle 223H is moved upwardly relative to backrest 218 and away from seat bottom 214 to establish a HEADREST-UNLOCKING MODE of headrest-height controller 212.

The auxiliary driver-engagement (first-gear) rack 244 that is coupled to second headrest-motion blocker 222 includes an outer blocker-extending surface 244E and a companion blocker-retracting surface 244R which cooperate to define therebetween a second gear-tooth receiver channel 231C2 as suggested in FIGS. 9 and 13. Rotary driver 230 further includes a single second gear tooth 231T2 provided in first motion-transfer gear 231 as shown in FIG. 5A and arranged to extend into the second gear-tooth receiver channel 231C2 and (1) to move outwardly to engage the outer blocker-extending surface 244E of the auxiliary driver-engagement (first-gear) rack 244 that is coupled to second headrest-motion blocker 222 to apply a movement-inducing force to the auxiliary driver-engagement (first-gear) rack 244 to cause second headrest-motion blocker 222 to move relative to backrest 218 to extend into the second blocker-receiver socket 182A during rotation of rotary driver 230 in the first direction relative to backrest 218 to establish a HEADREST-LOCKING MODE of headrest-height controller 212 and (2) to move inwardly to engage the outer blocker-retracting surface 244R of the auxiliary driver-engagement (first-gear) rack 244 that is coupled to second headrest-motion blocker 222 to apply a movement-inducing force to the auxiliary driver-engagement (first-gear) rack 244 to cause second headrest-motion blocker 222 to move relative to backrest 218 to withdraw from the second blocker-receiver socket 182A during rotation of rotary driver 230 in an opposite second direction relative to backrest 218 to establish a HEADREST-UNLOCKING MODE of headrest-height controller 212.

What is claimed is:

1. A child restraint comprising:

a seat bottom, a seat back including a backrest arranged to extend upwardly from the seat bottom and an adjustable headrest mounted for up-and-down movement on the backrest between a lowered position located at a first distance from the seat bottom and a raised position located at a relatively higher second distance from the seat bottom to accommodate and seat children of different sizes, and a headrest-height controller mounted on the adjustable headrest for up-and-down movement with the adjustable headrest relative to the backrest, the headrest-height controller includes a headrest lock arranged to move relative to the seat bottom to engage and disengage the backrest to control up-and-down movement of the adjustable headrest between the lowered and raised positions, a mover activator including an activation handle mounted on the adjustable headrest for up-and-down movement relative to the adjustable headrest and the backrest, and a headrest-lock mover arranged to move the headrest lock relative to the backrest to disengage the backrest to free the adjustable headrest to move up and down relative to the backrest in response to upward movement of the activation handle relative to the backrest and away from the seat bottom and to engage the backrest to retain the headrest in a selected one of the lowered and raised positions in response to downward movement of the adjustable headrest relative to the backrest and toward the seat bottom upon arrival of the adjustable headrest at such a selected one of the lowered and raised positions and during downward movement of the activation handle relative to the backrest, wherein the headrest-lock mover includes a first driver-engagement rack coupled to the activation handle and a rotary driver mounted for rotation relative to the backrest about an axis of rotation that extends in a rearward direction through the backrest to convert motion of the activation handle relative to the backrest into motion of the headrest lock relative to the backrest owing to meshing engagement of teeth in the rotary driver with the first driver-engagement rack to cause outward and inward movement-inducing forces to be applied to the headrest lock in response to movement of the activation handle relative to the backrest.

2. The child restraint of claim 1, wherein the backrest is formed to include a lower set of opposing first and second blocker-receiver sockets located at a first height above the seat bottom to align with the lowered position of the adjustable headrest and an upper set of first and second opposing blocker-receiver sockets located at a relatively higher second height above the seat bottom to align with the raised position of the adjustable headrest; and wherein the headrest lock includes a first headrest-motion blocker that is constrained to move laterally relative to the adjustable headrest to extend into the first blocker-receiver socket of the lower set to engage the backrest in response to application of an outward movement-inducing force applied to the first headrest-motion blocker by the headrest-lock mover when the adjustable headrest is located in the lower position and the activation handle is moved downwardly relative to the backrest and toward the seat bottom and to withdraw from the first blocker-receiver socket of the lower set to disengage the backrest in response to application of an inward movement-inducing force applied to the first headrest-motion blocker by the headrest-lock mover when the adjustable headrest is located in the lower position and the activation handle is moved upwardly relative to the backrest and away from the seat bottom to establish a headrest-unlocking mode of the headrest-height controller.

3. The child restraint of claim 2, wherein the headrest-lock mover further includes a second driver-engagement rack coupled to the first headrest-motion blocker, and wherein the rotary driver is configured to convert motion of the activation handle relative to the backrest into motion of the first headrest-motion blocker relative to the backrest owing to meshing engagement of teeth in the rotary driver with the first and second driver-engagement racks to cause the outward and inward movement-inducing forces to be applied to the first headrest-motion blocker in response to movement of the activation handle relative to the backrest.

4. The child restraint of claim 3, wherein the second driver-engagement rack coupled to the first headrest-motion blocker is a main first-gear rack that includes an outer blocker-extending surface and a companion inner blocker-retracting surface which cooperate to define therebetween a main gear-tooth receiver channel in the first headrest-motion blocker and the rotary driver includes a first motion-transfer gear comprising a single main gear tooth arranged to extend into the main gear-tooth receiver channel and to move outwardly to engage the blocker-extending surface to apply a movement-inducing force to the main first-gear rack to cause the first headrest-motion blocker to move relative to the backrest to extend into the first blocker-receiver socket during rotation of the rotary driver in a first direction relative to the backrest to establish a headrest-locking mode of the headrest-height controller and to move inwardly to engage the blocker-retracting surface of the main first-gear rack coupled to the first headrest-motion blocker to apply a movement-inducing force to the main first-gear rack to cause the first headrest-motion blocker to move relative to the backrest to withdraw from the first blocker-receiver socket during rotation of the rotary driver in an opposite second direction relative to the backrest to establish a headrest-unlocking mode of the headrest-height controller.

5. The child restraint of claim 4, wherein the headrest lock further includes a second headrest-motion blocker that is constrained to move laterally relative to the adjustable headrest and laterally away from the first headrest-motion blocker to extend into the second blocker-receiver socket of the lower set to engage the backrest in response to application of an outward movement-inducing force applied to the second headrest-motion blocker by the headrest-lock mover when the adjustable headrest is located in the lower position and the activation handle is moved downwardly relative to the backrest and toward the seat bottom to establish a headrest-locking mode of the headrest-height controller and to withdraw from the second blocker-receiver socket of the lower set to disengage the backrest in response to application of an inward movement-inducing force applied to the second headrest-motion blocker by the headrest-lock mover when the adjustable headrest is located in the lower position and the activation handle is moved upwardly relative to the backrest and away from the seat bottom to establish a headrest-unlocking mode of the headrest-height controller; and wherein the headrest-lock mover further includes an auxiliary first-gear rack coupled to the second headrest-motion blocker includes an outer blocker-extending surface and a companion blocker-retracting surface which cooperate to define therebetween an auxiliary gear-tooth receiver channel in the second headrest-motion blocker, and wherein the first motion-transfer gear of the rotary driver further includes a single auxiliary gear tooth arranged to extend into the auxiliary gear-tooth receiver channel and to move outwardly to engage the outer blocker-extending surface of the auxiliary first-gear rack coupled to the second headrest-motion blocker to apply a movement-inducing force to the first driver-engagement rack to cause the second headrest-motion blocker to move relative to the backrest to extend into the second blocker-receiver socket during rotation of the rotary driver in the first direction relative to the backrest to establish a headrest-locking mode of the headrest-height controller and to move inwardly to engage the outer blocker-retracting surface of the auxiliary first-gear rack coupled to the second headrest-motion blocker to apply a movement-inducing force to the auxiliary first-gear rack to cause the second headrest-motion blocker to move relative to the backrest to withdraw from the second blocker-receiver socket during rotation of the rotary driver in an opposite second direction relative to the backrest to establish a headrest-unlocking mode of the headrest-height controller.

6. The child restraint of claim 3, wherein the mover activator of the headrest-height controller further includes a return spring that is coupled to each of the activation handle and the backrest and biased normally and yieldably to urge the activation handle to move downwardly relative to the backrest and toward the seat bottom to rotate the rotary driver included in the headrest-lock mover owing to meshing engagement of teeth in the first driver-engagement rack coupled to the activation handle and teeth in the rotary driver so that rotation of the rotary driver moves the first headrest-motion blocker relative to the backrest to extend into the first blocker-receiver socket of the lower set owing to meshing engagement of the teeth in the rotary driver and of teeth in the second driver-engagement rack coupled to the first headrest-motion blocker as the rotary driver rotates relative to the backrest.

7. The child restraint of claim 6, wherein the headrest lock further includes a second headrest-motion blocker that is constrained to move laterally relative to the adjustable headrest and laterally away from the first headrest-motion blocker to extend into the second blocker-receiver socket of the lower set to engage the backrest in response to application of an outward movement-inducing force applied to the second headrest-motion blocker by the headrest-lock mover when the adjustable headrest is located in the lower position and the activation handle is moved downwardly relative to the backrest and toward the seat bottom to establish a headrest-locking mode of the headrest-height controller and to withdraw from the second blocker-receiver socket of the lower set to disengage the backrest in response to application of an inward movement-inducing force applied to the second headrest-motion blocker by the headrest-lock mover when the adjustable headrest is located in the lower position and the activation handle is moved upwardly relative to the backrest and away from the seat bottom to establish a headrest-unlocking mode of the headrest-height controller.

8. The child restraint of claim 7, wherein the headrest-lock mover further includes a first auxiliary driver-engagement rack coupled to the activation handle, a second auxiliary driver-engagement rack coupled to the second headrest-motion blocker, and the rotary driver is mounted for rotation relative to the backrest to convert motion of the activation handle relative to the backrest into motion of the second headrest-motion blocker relative to the backrest owing to meshing engagement of teeth in the rotary driver with the first and second auxiliary driver-engagement racks to cause outward and inward movement-inducing forces to be applied to the second headrest-motion blocker in response to movement of the activation handle relative to the backrest.

9. The child restraint of claim 6, wherein the adjustable headrest includes a head cradle configured to receive a head of a child seated configured to receive a head of a child seated on the seat bottom and palm-grip portion coupled to an upper portion of the head cradle and formed to include a forward-facing handgrip window that will be visible to a caregiver facing a front side of the head cradle and an upper end of the activation handle includes an operator finger grip that has a downwardly facing bottom edge that is adapted to engaged by finger tips of a hand of a caregiver while a palm of that hand rests on an upwardly facing outer palm-support surface of the palm-grip portion of the adjustable headrest and that is exposed in the forward-facing window to be seen and touched by the caregiver when the activation handle is urged downwardly relative to the backrest by a spring force generated by the return spring and applied to the activation handle.

10. The child restraint of claim 9, wherein the downwardly facing bottom edge of the operator finger grip moves upwardly in the forward-facing handgrip window formed in the palm grip portion of the adjustable headrest in a direction away from the seat bottom to move the activation handle relative to the backrest and against a spring force generated by the return spring in response to application of an upwardly directed movement-inducing force applied to the downwardly facing bottom edge of the operator finger grip by fingertips of an operator while a palm of the operator is at rest on the upwardly facing palm-support surface of the palm grip portion of the adjustable headrest.

11. The child restraint of claim 3, wherein the rotary driver of the headrest-lock mover includes a gear mount constrained to rotate about the axis of rotation associated with the rotary driver, a first motion-transfer gear associated with the first headrest-motion blocker and coupled to the gear mount to rotate therewith, and a second motion-transfer gear associated with the activation handle and coupled to the gear mount to rotate therewith, the second driver-engagement rack coupled to the first headrest-motion blocker is a main first-gear rack that is formed to include a main gear-tooth receiver channel, the first motion-transfer gear comprises a single main gear tooth arranged to extend into the main gear-tooth receiver to apply a motion-inducing force to the first headrest-motion blocker to cause the first headrest-motion blocker to move relative to the backrest into the first blocker-receiver socket during rotation of the gear mount in a first direction about the axis of rotation of the rotary driver to establish a headrest-locking mode of the headrest-height controller and to move out of the first blocker-receiver socket during rotation of the gear mount in an opposite second direction about the axis of rotation of the rotary driver to establish a headrest-unlocking mode of the headrest-height controller, the first driver-engagement rack coupled to the activation handle is a main second-gear rack that includes teeth, and the second motion-transfer gear is arranged to engage the teeth included in the main second-gear rack to cause the second motion-transfer gear to rotate in the opposite second direction about the axis of rotation of the rotary driver in response to upward movement of the activation handle relative to the backrest so that the gear mount and the first motion-transfer gear also rotate in the opposite second direction to cause the first headrest-motion blocker to move out of the first blocker-receiver socket to free the adjustable headrest for up-and-down movement relative to the backrest.

12. The child restrain of claim 11, wherein the activation handle further includes an auxiliary second-gear rack that includes teeth and is arranged to lie in spaced-apart relation to the main second-gear rack to receive the second motion-transmission gear therebetween to cause teeth in the second motion-transmission gear to mate and mesh with teeth in each of the main and auxiliary second-gear racks.

13. The child restrain of claim 12, wherein the second motion-transfer gear includes a main segment including a main set of teeth and a separate auxiliary segment including an auxiliary set of teeth, the main segment is coupled to the gear mount to mate and mesh teeth in the main set of teeth with the main second-gear rack, and the auxiliary segment is coupled to the gear mount to mate and mesh teeth in the auxiliary set of teeth with the auxiliary second-gear rack.

14. The child restraint of claim 13, wherein the main segment further includes a main tooth-support platform appended to a first end of the gear mount and arranged to extend in a radially outward direction away from the axis of rotation associated with the rotary driver and the main set of teeth included in the main segment are coupled to an axially outwardly facing surface of the main tooth-support platform and arranged to extend away from the gear mount to cause each tooth in the main set of teeth to be presented in a radially outward direction extending away from the axis of rotation associated with the rotary driver.

15. The child restraint of claim 14, wherein the first motion-transfer gear is coupled to an opposite second end of the gear movement.

16. The child restraint of claim 15, wherein the first motion-transfer gear of the rotary driver includes a simple main gear tooth coupled to the opposite second end of the gear movement and arranged to extend in a first direction to lie in perpendicular relation to the axis of rotation associated with the rotary driver and a single auxiliary gear tooth coupled to the opposite second end of the gear mount and arranged to extend in an opposite second direction to lie in perpendicular relation to the axis of rotation associated with the rotary driver, the single main gear tooth includes a free and arranged to move into and out of a main gear-tooth receiver channel formed in the first headrest-motion blocker during up-and-down movement of the activation handle relative to the backrest, and the single auxiliary gear tooth includes a free end arranged to move into and out of an auxiliary gear-tooth receiver channel formed in the second headrest-motion blocker during up-and-down movement of the activation handle relative to the backrest.

17. The child restraint of claim 14, wherein the main tooth-support platform includes a perimeter edge around the axially outwardly facing surface and wherein the perimeter edge includes a curved radially outwardly facing surface, a first chordal surface interconnecting the gear mount and a first end of the curved radially outwardly facing surface, and a separate second chordal surface interconnecting the gear mount and an opposite second end of the curved radially outwardly facing surface.

18. The child restraint of claim 17, wherein the auxiliary segment further includes an auxiliary tooth-support platform appended to the first end of the gear mount and arranged to lie in spaced-apart relation to the main tooth-support platform and extend in a radially outward direction away from the axis of rotation associated with the rotary driver and the auxiliary set of teeth is coupled to an axially outwardly facing surface of the auxiliary tooth-support platform and arranged to lie in spaced apart relation to the main set of teeth and to extend away from the gear mount to cause each tooth in the auxiliary set of teeth to be presented in a radially outward direction extending away from the axis of rotation associated with the rotary driver.

19. The child restraint of claim 12, wherein the second motion-transfer gear includes a main set of teeth arranged to lie on one side of the axis rotation associated with the rotary driver and to mate and mesh only with the main second-gear rack included in the activation handle during up-and down movement of the activation handle relative to the backrest and a separate auxiliary set of teeth arranged to lie in spaced-apart relation to the main set of teeth to locate the axis of rotation of the rotary drive therebetween and to mate and mesh only with the auxiliary second-gear rack of the activation handle during up-and-down movement of the activation handle relative to the backrest.

20. The child restraint of claim 19, wherein the main set of teeth extend along a main arc subtended by a first acute angle having a vertex on the axis of rotation associated with the rotary driver so that all of the teeth in the main set of teeth lie on the main arc between first and second endpoints of the main arc to cause a free end of each tooth in the main set of teeth to face away from the axis of rotation associated with the rotary driver and wherein the auxiliary set of teeth extend along an auxiliary arc subtended by a second acute angle having a vertex on the axis of rotation associated with the rotary driver so that all of the teeth in the auxiliary set of teeth lie on the auxiliary are between first and second endpoints of the auxiliary arc to cause a free end of each tooth in the auxiliary set of teeth to face away from the axis of rotation associated with the rotary driver.

21. The child restraint of claim 12, wherein the second motion-transfer gear of the rotary driver is arranged to lie between the first motion-transfer gear of the rotary driver and the backrest.

22. The child restraint of claim 21, wherein the gear mount has a cylindrical shape, the second motion-transfer gear is coupled to one end of the gear mount, and the first motion-transfer gear is coupled to an opposite end of the gear mount.

* * * * *